United States Patent
Sugimoto

(10) Patent No.: US 9,924,050 B2
(45) Date of Patent: Mar. 20, 2018

(54) OPERATION DISPLAY APPARATUS, PORTABLE TERMINAL, PROGRAMS THEREFOR, AND OPERATION DISPLAY SYSTEM

(71) Applicant: Konica Minolta, Inc., Chiyoda-ku, Tokyo (JP)

(72) Inventor: Yasuaki Sugimoto, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/856,934

(22) Filed: Sep. 17, 2015

(65) Prior Publication Data
US 2016/0088174 A1  Mar. 24, 2016

(30) Foreign Application Priority Data
Sep. 18, 2014  (JP) .................................. 2014-190037

(51) Int. Cl.
*H04N 1/00* (2006.01)
*G06F 3/12* (2006.01)

(52) U.S. Cl.
CPC ....... *H04N 1/00392* (2013.01); *G06F 3/1204* (2013.01); *G06F 3/1214* (2013.01);
(Continued)

(58) Field of Classification Search
CPC ....... H04N 1/00392; H04N 2201/0032; H04N 2201/0062; H04N 2201/0094; G06F 3/1204; G06F 3/1214
(Continued)

(56) References Cited

U.S. PATENT DOCUMENTS

2008/0291283 A1  11/2008  Achiwa et al.
2011/0239114 A1*  9/2011  Falkenburg ......... G06F 3/04883
                                                        715/702
(Continued)

FOREIGN PATENT DOCUMENTS

JP   2004-021522 A   1/2004
JP   2008-123476 A   5/2008
(Continued)

OTHER PUBLICATIONS

Machine translation of Japanese Patent Document No. 2013-088506, Aizawa, May 13, 2013.*
(Continued)

*Primary Examiner* — Mark R Milia
(74) *Attorney, Agent, or Firm* — Buchanan Ingersoll & Rooney PC

(57) ABSTRACT

An operation display apparatus includes: an operating unit; a display unit; a position detecting unit configured to detect a position of a predetermined portable terminal; a free region detecting unit configured to detect a free region on a display screen of at least one of the display unit and the portable terminal; and an operation control unit configured to display an image of the operating unit in the free region when the position of the portable terminal detected by the position detecting unit is in front of a front side of the operating unit, and accept an operation performed on the image, as an operation received by the operating unit, the free region being detected by the free region detecting unit.

35 Claims, 17 Drawing Sheets

(52) U.S. Cl.
    CPC ..... *H04N 1/00307* (2013.01); *H04N 1/00477* (2013.01); *H04N 2201/0032* (2013.01); *H04N 2201/0062* (2013.01); *H04N 2201/0094* (2013.01)

(58) Field of Classification Search
    USPC ........................................................ 358/1.15
    See application file for complete search history.

(56) References Cited

U.S. PATENT DOCUMENTS

| 2014/0240763 | A1* | 8/2014 | Urakawa | G06F 3/1292 |
| | | | | 358/1.15 |
| 2014/0293338 | A1* | 10/2014 | Murakami | H04N 1/00413 |
| | | | | 358/1.15 |

FOREIGN PATENT DOCUMENTS

| JP | 2013-088506 A | 5/2013 |
| JP | 2013-109614 A | 6/2013 |

OTHER PUBLICATIONS

Office Action (Decision of Rejection) dated Apr. 4, 2017, by the Japanese Patent Office in corresponding Japanese Patent Application No. 2014-190037 and an English translation of the Office Action. (9 pages).

Office Action (Notification of Reasons for Rejection) dated Dec. 6, 2016 by the Japanese Patent Office in corresponding Japanese Patent Application No. 2014-190037, and English language translation of Office Action (11 pages).

\* cited by examiner

FIG. 17
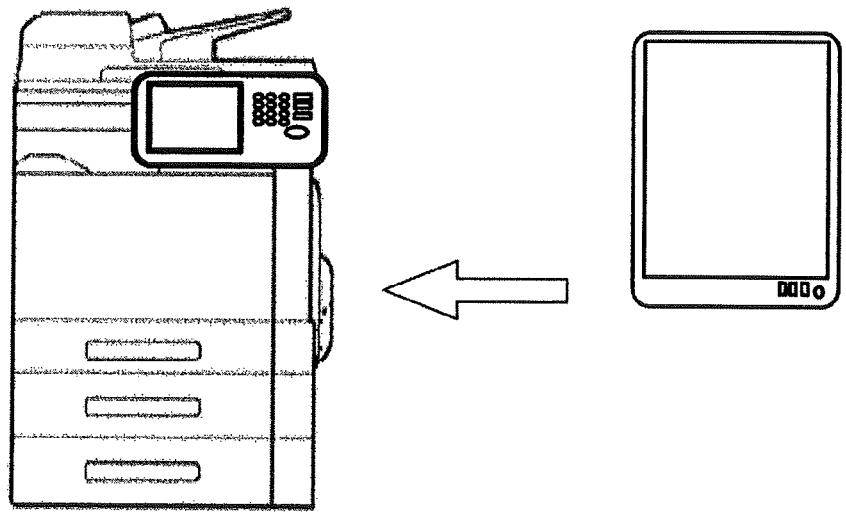
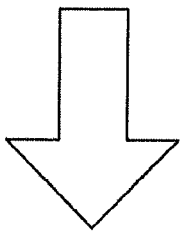
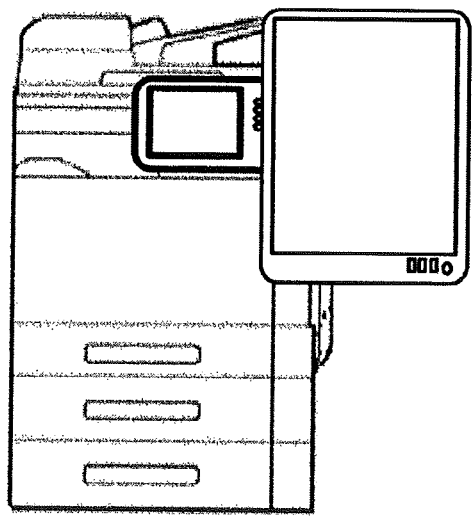

OPERATION DISPLAY APPARATUS, PORTABLE TERMINAL, PROGRAMS THEREFOR, AND OPERATION DISPLAY SYSTEM

The entire disclosure of Japanese Patent Application No. 2014-190037 filed on Sep. 18, 2014 including description, claims, drawings, and abstract are incorporated herein by reference in its entirety.

BACKGROUND OF THE INVENTION

Field of the Invention

The present invention relates to an operation display apparatus using a portable terminal in combination therewith, a portable terminal, programs therefor, and an operation display system.

Description of the Related Art

A method of using an operating panel included in an image processing apparatus, such as a multifunction peripheral, and a user's portable terminal such that they perform cooperative operation is disclosed in JP 2013-088506 A. In JP 2013-088506 A, a continuous part of an image displayed on the operating panel is displayed on the portable terminal apposed to the operating panel, by which, for example, one large image can be displayed.

In this method, when the operating panel and the portable terminal are used such that they perform cooperative operation, it is desirable to place the portable terminal in a position where the user can view both of a screen of the operating panel and a screen of the portable terminal at a time. For example, FIG. 17 shows a state of when a screen of a portable terminal is located adjacent to a screen of an operating panel included in an image processing apparatus. In this state, a user can view both of the screens at a time.

However, in many operating panels, hard keys are placed adjacent to a screen, and thus, depending on the placement position, a portable terminal lies on top of the hard keys on the operating panel, making it impossible for a user to press the hard keys. Note that the same problem occurs not only in the hard keys, but also in soft keys displayed on the screen.

SUMMARY OF THE INVENTION

The present invention has been made to solve the above-described problem, and an object of the present invention is to provide an operation display apparatus, a portable terminal, programs therefor, and an operation display system that are capable of accepting, even in a state in which an operating unit is hidden behind a portable terminal which is brought close to the operating unit, and thus cannot be operated by a user, the same operations as those performed on the hidden operating unit from a user.

The following items of the invention present a summary of the present invention made to attain the object.

[1] To achieve the abovementioned object, according to an aspect, an operation display apparatus, reflecting one aspect of the present invention comprises: an operating unit; a display unit; a position detecting unit configured to detect a position of a predetermined portable terminal; a free region detecting unit configured to detect a free region on a display screen of at least one of the display unit and the portable terminal; and an operation control unit configured to display an image of the operating unit in the free region when the position of the portable terminal detected by the position detecting unit is in front of a front side of the operating unit, and accept an operation performed on the image, as an operation received by the operating unit, the free region being detected by the free region detecting unit.

In the invention of the above-described Item. 1 and following Items. 11 and 21, a free region on a display screen of at least one of the display unit and the portable terminal is detected. When the portable terminal is located in front of the front side of the operating unit, an image (substitute buttons) of the operating unit hidden by the portable terminal when viewed from the user is displayed in the detected free region. Then, an operation received by the substitute buttons is accepted as an operation received by the operating unit. By this, the same operations as those performed on the operating unit that is hidden behind the portable terminal and thus cannot be operated by the user can be accepted from the user. Note that when a part of the operating unit and the portable terminal lie on top of each other, an image of the entire operating unit may be displayed in a free region, or only an image of a portion of the operating unit, on top of which the portable terminal is placed, may be displayed in a free region.

[2] The operation display apparatus of Item. 1, wherein the operation control unit preferably displays, in the free region, an image of a portion of the operating unit, the portable terminal being located in front of a front side of the portion of the operating unit.

[3] The operation display apparatus of Item. 1 or 2, wherein the operation control unit preferably switches whether to perform the display, based on whether the position of the portable terminal detected by the position detecting unit is within a predetermined distance in a frontward direction of the front side of the operating unit.

In the invention of the above-described Item. 3 and following Items. 13 and 23, whether to perform display of substitute buttons is switched depending on the distance between the operating unit and the portable terminal. For example, even if the operating unit and the portable terminal lie on top of each other, when they are away from each other (when they are away from each other by a predetermined distance or more), the user can perform operations on the operating unit by putting his/her hand in space between the operating unit and the portable terminal. Thus, display of substitute buttons is not performed.

[4] The operation display apparatus of any one of Items. 1 to 3, wherein the operation control unit preferably invalidates acceptance of an operation performed on a portion of the operating unit that appears in the image, while the image of the operating unit is displayed in the free region.

In the invention of the above-described Item. 4 and following Items. 14 and 24, while substitute buttons are displayed in a free region, acceptance of operations performed on a portion of the operating unit that appears as the substitute buttons is invalidated. By this, when the portable terminal is brought close to the operating unit and used, the occurrence of erroneous operations caused by the portable terminal or a hand holding the portable terminal touching the operating unit can be prevented.

[5] The operation display apparatus of any one of Items. 1 to 4, wherein, when the free region detecting unit detects a plurality of free regions, the operation control unit preferably selects a largest region among the plurality of free regions, as a free region where the display is to be performed.

[6] The operation display apparatus of any one of Items. 1 to 4, wherein, when the free region detecting unit detects a plurality of free regions, the operation control unit preferably notifies a user of the plurality of free regions, and receives specification of a free region where the display is to be performed from among the plurality of free regions, and selects the specified free region as a free region where the display is to be performed.

In the invention of the above-described Item. 6 and following Items. 16 and 26, when there are a plurality of free regions, selection of which free region is to be used is received from the user.

[7] The operation display apparatus of any one of Items. 1 to 6, wherein the operation control unit preferably scales down the image of the operating unit and displays the scaled-down image in the free region.

In the invention of the above-described Item. 7 and following Items. 17 and 27, substitute buttons are scaled down and displayed in a free region. By this, when the free region is insufficient to display the substitute buttons in the original size, the substitute buttons can be displayed.

[8] The operation display apparatus of any one of Items. 1 to 7, wherein the operating unit preferably includes a plurality of operating buttons, and the operation control unit preferably displays, in the free region, an image of some of operating buttons, the portable terminal being located in front of a front side of the operating buttons.

In the invention of the above-described Item. 8 and following Items. 18 and 28, the operating unit includes a plurality of operating buttons, and an image (some substitute buttons) of some operating buttons is displayed in a free region. For example, by displaying substitute buttons for only those operating buttons required for operations performed on a screen being displayed, even if the free region is small, the substitute buttons required for operations are displayed. Each operating button may be assigned a priority, and operating buttons whose substitute buttons are to be displayed may be selected according to the priorities.

[9] The operation display apparatus of Item. 8, wherein the operation control unit preferably displays, in the free region, an image of an operating button on a priority basis among the operating buttons, the portable terminal being located in front of the front side of the operating buttons, and the operating button being used for an operation performed on a screen being displayed by the display unit.

In the invention of the above-described Item. 9 and following Items. 19 and 29, of operating buttons, in front of the front side of which the portable terminal is located, an image of operating buttons which are used for operations performed on a screen being displayed by the display unit of the operation display apparatus is displayed on a priority basis in a free region. Namely, even if the free region is small, substitute buttons required for operations are displayed on a priority basis. Thus, even when the free region is insufficient to display an image of all operating buttons, there is no trouble performing operations.

[10] The operation display apparatus of any one of Items. 1 to 9, wherein the position detecting unit preferably repeatedly performs the detection, and when there is a change in a result of the detection, the operation control unit preferably changes content of the display, according to the change.

In the invention of the above-described Item. 10 and following Items. 20 and 30, detection of a free region is repeatedly performed. When there is a change in a result of the detection, the display content of substitute buttons is changed according to the change. Even when the portable terminal is moved or when there is a change in the size of the free region, substitute buttons are always displayed in a suitable position.

[11] To achieve the abovementioned object, according to an aspect, an operation display system including a portable terminal and an operation display apparatus including an operating unit and a display unit, the system reflecting one aspect of the present invention comprises: a position detecting unit configured to detect a position of the portable terminal relative to the operation display apparatus; a free region detecting unit configured to detect a free region on a display screen of at least one of the display unit and the portable terminal; and an operation control unit configured to display an image of the operating unit in the free region when the position of the portable terminal detected by the position detecting unit is in front of a front side of the operating unit, and accept an operation performed on the image, as an operation received by the operating unit, the free region being detected by the free region detecting unit.

[12] The operation display system of Item. 11, wherein the operation control unit preferably displays, in the free region, an image of a portion of the operating unit, the portable terminal being located in front of a front side of the portion of the operating unit.

[13] The operation display system of Item. 11 or 12, wherein the operation control unit preferably switches whether to perform the display, based on whether the position of the portable terminal detected by the position detecting unit is within a predetermined distance in a frontward direction of the front side of the operating unit.

[14] The operation display system of any one of Items. 11 to 13, wherein the operation control unit preferably invalidates acceptance of an operation performed on a portion of the operating unit that appears in the image, while the image of the operating unit is displayed in the free region.

[15] The operation display system of any one of Items. 11 to 14, wherein, when the free region detecting unit detects a plurality of free regions, the operation control unit preferably selects a largest region among the plurality of free regions, as a free region where the display is to be performed.

[16] The operation display system of any one of Items. 11 to 14, wherein, when the free region detecting unit detects a plurality of free regions, the operation control unit preferably notifies a user of the plurality of free regions, and receives specification of a free region where the display is to be performed from among the plurality of free regions, and selects the specified free region as a free region where the display is to be performed.

[17] The operation display system of any one of Items. 11 to 16, wherein the operation control unit preferably scales down the image of the operating unit and displays the scaled-down image in the free region.

[18] The operation display system of any one of Items. 11 to 17, wherein the operating unit preferably includes a plurality of operating buttons, and the operation control unit preferably displays, in the free region, an image of some of operating buttons, the portable terminal being located in front of a front side of the operating buttons.

[19] The operation display system of Item. 18, wherein the operation control unit preferably displays, in the free region, an image of an operating button on a priority basis among the operating buttons, the portable terminal being located in front of the front side of the operating buttons, and the operating button being used for an operation performed on a screen being displayed by the display unit.

[20] The operation display system of any one of Items. 11 to 19, wherein the position detecting unit preferably repeatedly performs the detection, and when there is a change in a result of the detection, the operation control unit preferably changes content of the display, according to the change.

[21] To achieve the abovementioned object, according to an aspect, a portable terminal reflecting one aspect of the present invention comprises: an operation input unit; a display unit; a position detecting unit configured to detect a position of the terminal; a free region detecting unit configured to detect a free region on a display screen of at least one of a predetermined operation display apparatus and the display unit, the operation display apparatus including an operating unit; and a control unit configured to display an image of the operating unit in the free region when the position of the terminal detected by the position detecting unit is in front of a front side of the operating unit, and accept an operation performed on the image, as an operation received by the operating unit, the free region being detected by the free region detecting unit.

[22] The portable terminal of Item. 21, wherein the control unit preferably displays, in the free region, an image of a portion of the operating unit, the terminal being located in front of a front side of the portion of the operating unit.

[23] The portable terminal of Item. 21 or 22, wherein the control unit preferably switches whether to perform the display, based on whether the position of the terminal detected by the position detecting unit is within a predetermined distance in a frontward direction of the front side of the operation input unit.

[24] The portable terminal of any one of Items. 21 to 23, wherein the control unit preferably invalidates acceptance of an operation performed on a portion of the operating unit that appears in the image, while the image of the operating unit is displayed in the free region.

[25] The portable terminal of any one of Items. 21 to 24, wherein, when the free region detecting unit detects a plurality of free regions, the control unit preferably selects a largest region among the plurality of free regions, as a free region where the display is to be performed.

[26] The portable terminal of any one of Items. 21 to 24, wherein, when the free region detecting unit detects a plurality of free regions, the control unit preferably notifies a user of the plurality of free regions, and receives specification of a free region where the display is to be performed from among the plurality of free regions, and selects the specified free region as a free region where the display is to be performed.

[27] The portable terminal of any one of Items. 21 to 26, wherein the control unit preferably scales down the image of the operating unit and displays the scaled-down image in the free region.

[28] The portable terminal of any one of Items. 21 to 27, wherein the operating unit preferably includes a plurality of operating buttons, and the control unit preferably displays, in the free region, an image of some of operating buttons, the portable terminal being located in front of a front side of the operating buttons.

[29] The portable terminal of Item. 28, wherein the control unit preferably displays, in the free region, an image of an operating button on a priority basis among the operating buttons, the terminal being located in front of the front side of the operating buttons, and the operating button being used for an operation performed on a screen being displayed by the display unit.

[30] The portable terminal of any one of Items. 21 to 29, wherein the position detecting unit preferably repeatedly performs the detection, and when there is a change in a result of the detection, the control unit preferably changes content of the display, according to the change.

[31] A non-transitory recording medium storing a computer readable program for causing an information processing apparatus to function as an operation display apparatus of any one of Items. 1 to 10.

[32] A non-transitory recording medium storing a computer readable program for causing a portable information processing apparatus to function as the portable terminal of any one of Items. 21 to 30.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 17 is a diagram showing a state of when a portable terminal is located adjacent to an operating panel included in an image processing apparatus.

DESCRIPTION OF THE PREFERRED EMBODIMENTS

Hereinafter, an embodiment of the present invention will be described with reference to the drawings. However, the scope of the invention is not limited to the illustrated examples.

Figure 1:
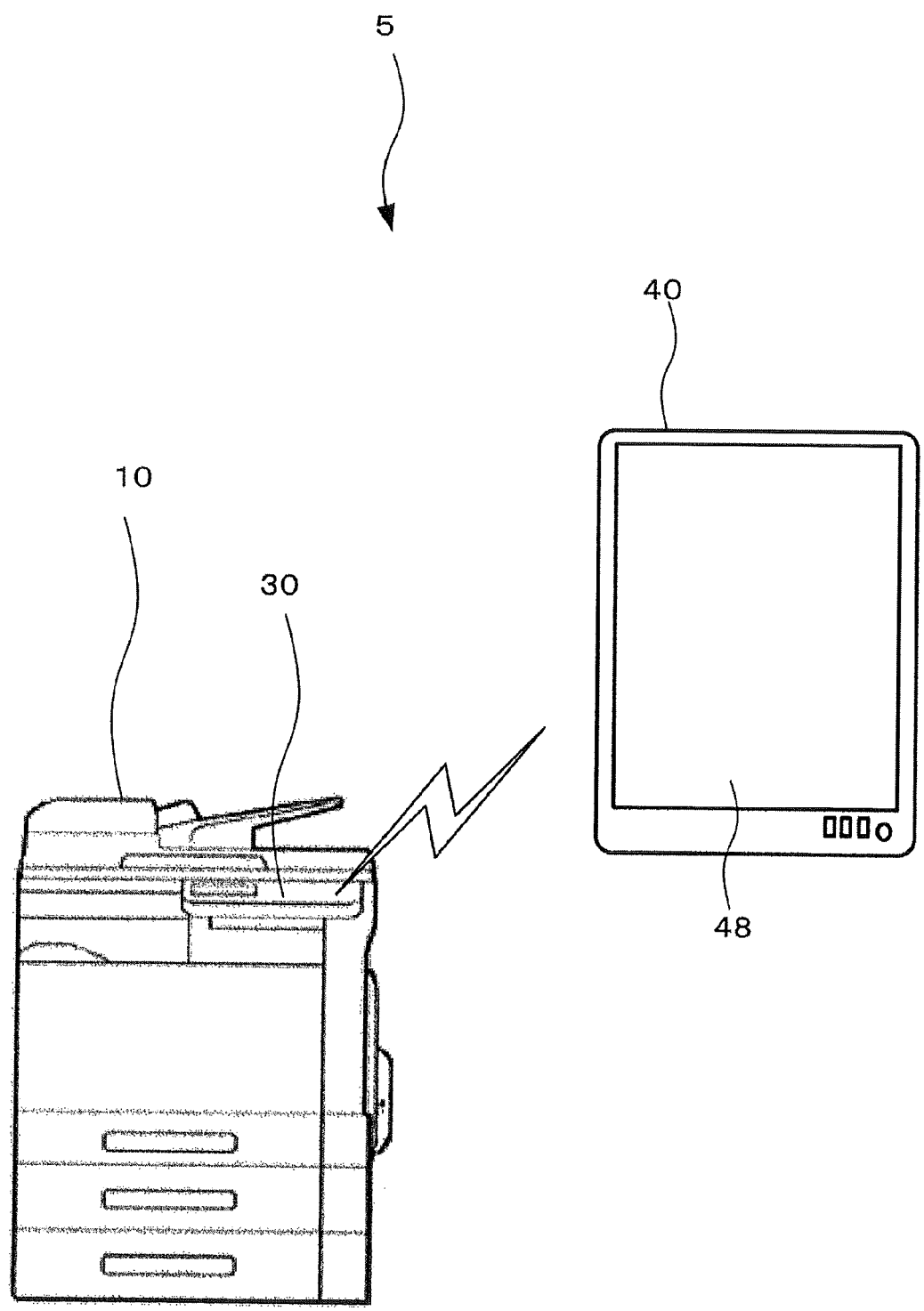
FIG. 1 is a diagram showing an exemplary configuration of an operation display system according to an embodiment of the present invention.

FIG. 1 shows an exemplary configuration of an operation display system 5 according to an embodiment of the present invention. The operation display system 5 includes an image processing apparatus 10 serving as an operation display apparatus of the present invention; and a portable terminal 40 capable of providing display content in conjunction with the image processing apparatus 10 through wireless communication. The portable terminal 40 is connected to the image processing apparatus 10 by a network such as a Local Area Network (LAN) or near-field communication such that they can perform wireless communication with each other.

The image processing apparatus 10 is a so-called multi-function peripheral (MFP) having, for example, a copy function that optically reads a document and prints a copied image of the document onto recording paper, a scan function that saves image data of a read document as a file or transmits the image data to an external terminal through a network, a printer function that forms an image for print data which is received from a Personal Computer (PC) or the like through a network, on recording paper and prints out the image, and a facsimile function that transmits and receives image data according to a facsimile procedure. In the embodiment of the present invention, the image processing apparatus 10 includes an operating panel 30 including a display unit 31 and an operating unit 32 (see FIG. 2). The operating panel 30 accepts setting operations for printing, etc.

The portable terminal 40 is a portable information processing apparatus such as a tablet. In the embodiment of the present invention, the portable terminal 40 performs cooperative operation with the image processing apparatus 10. In the embodiment of the present invention, as an example of the cooperative operation, there is shown conjunction display where the display content of a display unit 48 of the portable terminal 40 which will be described later and the display content of the display unit 31 of the operating panel 30 are provided in conjunction with each other to display one large image.

When conjunction display is performed, a user brings the portable terminal 40 close to the operating panel 30 so that he/she can view the display unit 31 and the display unit 48 at a time, by which he/she checks the image. At this time, when the portable terminal 40 is located in front of the front side of the operating panel 30 including the operating unit 32, the operating unit 32 is hidden by the portable terminal 40 when viewed from the user of the portable terminal 40, making it impossible for the user to perform operations on the operating unit 32. Here, the front side of the operating panel 30 refers to a side where operating buttons, etc., which can be operated by the user are arranged, and a side of the operating panel 30 viewed from the top thereof in the state of the image processing apparatus 10 shown in FIG. 1.

Hence, when the user brings the portable terminal 40 close to the operating panel 30 such that the portable terminal 40 is placed in front of the front side of the operating panel 30, the operation display system 5 performs a substitute button display process to display an image of the operating unit 32 mounted on the operating panel 30, on the display screen of the portable terminal 40 or the display unit 31, as substitute buttons. Then, an operation performed on the substitute buttons (the image of the operating unit 32) is accepted as an operation received by the operating unit 32. By this, even in a state in which the operating unit 32 is hidden behind the portable terminal 40 and thus the user cannot perform any operation on the operating unit 32, the user can perform the same operations as those performed on the operating unit 32, on the substitute buttons displayed in a free region.

Figure 2:
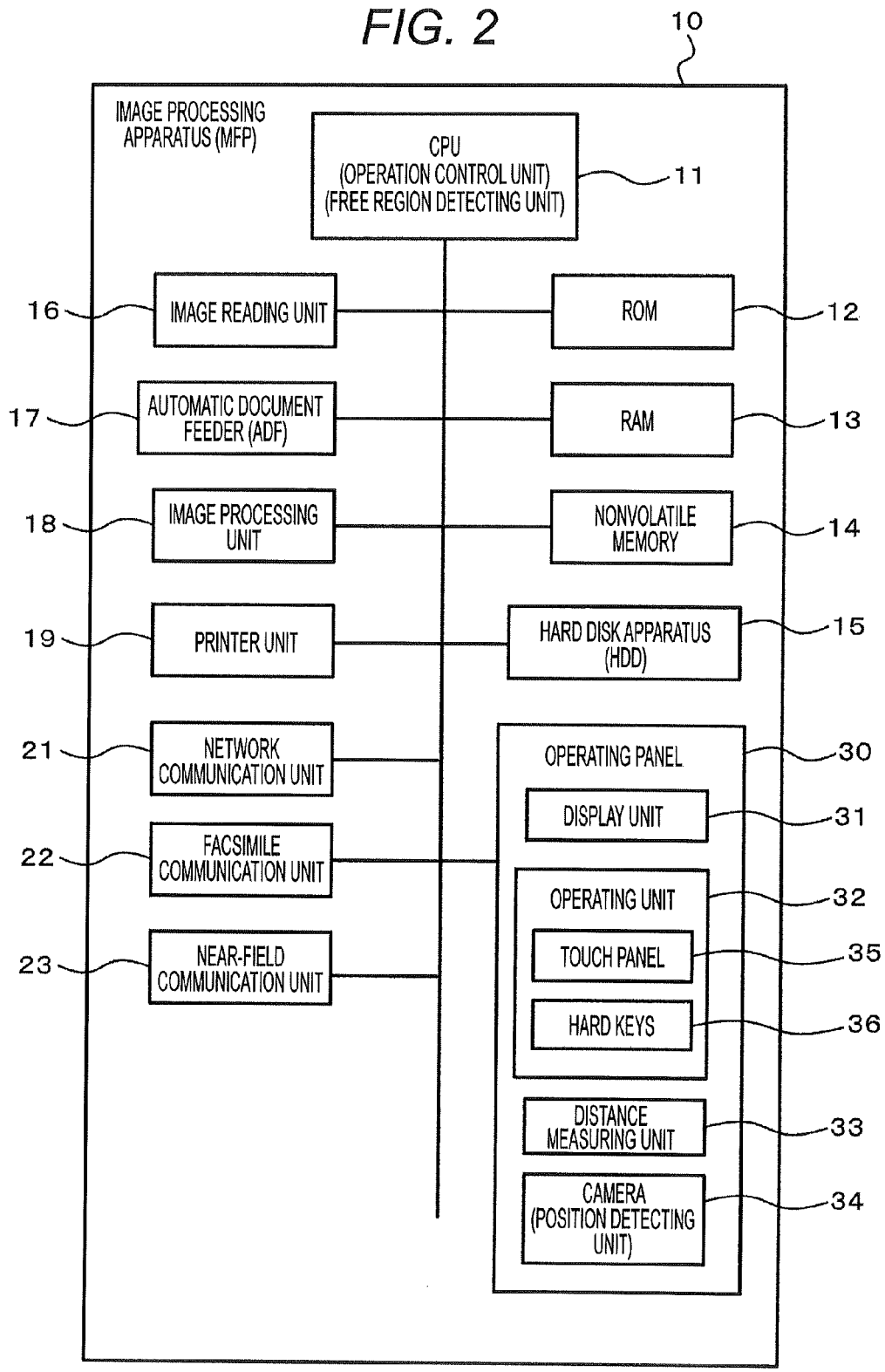
FIG. 2 is a block diagram showing a schematic configuration of an image processing apparatus.

FIG. 2 is a block diagram showing a schematic configuration of the image processing apparatus 10. The image processing apparatus 10 includes a Central Processing Unit (CPU) 11 serving as a control unit that performs overall control of the operation of the image processing apparatus 10. To the CPU 11 are connected, through a bus, a Read Only Memory (ROM) 12, a Random Access Memory (RAM) 13, a nonvolatile memory 14, a hard disk apparatus 15, an image reading unit 16, an automatic document feeder (ADF) 17, an image processing unit 18, a printer unit 19, a network communication unit 21, a facsimile communication unit 22, a near-field communication unit 23, the operating panel 30, etc.

The CPU 11 uses an OS program as a base program, and executes middleware, an application program, etc., on the OS program. The ROM 12 stores various types of programs. By the CPU 11 performing various types of processes according to the programs, the functions of the image processing apparatus 10 are implemented. The CPU 11 serves as an operation control unit of the present invention.

The RAM 13 is used as, for example, a working memory that temporarily stores various types of data when the CPU 11 performs processes based on a program, and an image memory that stores image data.

The nonvolatile memory 14 is a memory (flash memory) whose stored content is not destructed even if power is turned off, and is used, for example, to save various types of setting information.

The hard disk apparatus 15 is a large-capacity nonvolatile storage apparatus, and stores various types of programs and data in addition to print data and display screen data. In the embodiment of the present invention, the hard disk apparatus 15 stores a management table which will be described later, etc.

The image reading unit 16 functions to optically read a document to obtain image data. The image reading unit 16 is configured to include, for example, a light source that irradiates a document with light; a line image sensor that reads the document for one line in a width direction by receiving reflected light of the light; a moving unit that sequentially moves a line-by-line read position in a length direction of the document; an optical path including a lens, a mirror, etc., that guide reflected light from the document to the line image sensor to form an image; and a converting unit that converts an analog image signal outputted from the line image sensor into digital image data.

The automatic document feeder 17 functions to send out and feed documents set on a document table one by one in turn from the top, and allow the documents to pass through the read position of the image reading unit 16, and then discharge the documents to a predetermined discharge location. The image reading unit 16 has the function of reading a document placed on platen glass and the function of sequentially reading documents fed by the automatic document feeder 17.

The image processing unit 18 performs a rasterization process that converts print data into image data, an image data compression/decompression process, etc., in addition to processes such as the zoom-in/out and rotation of an image.

The printer unit 19 functions to form an image for image data on recording paper. Here, the printer unit 19 is configured as a so-called laser printer that includes a recording paper feeding apparatus, a photoconductor drum, a charging apparatus, a laser unit, a developing apparatus, a transfer/ separation apparatus, a cleaning apparatus, and a fusing apparatus, and that performs image formation by an electrophotographic process. Image formation may be performed by other schemes.

The network communication unit 21 functions to communicate with the portable terminal 40, an external PC, a server, etc., through a network such as a LAN.

The facsimile communication unit 22 functions to transmit and receive image data to/from an external apparatus having a facsimile function, through a telephone line.

The near-field communication unit 23 performs near-field communication with an external apparatus such as the portable terminal 40. The communicable distance is, for example, within 15 cm. The near-field communication unit 23 is provided on the operating panel 30 and allows only communication with an apparatus present within 15 cm from the operating panel 30.

The operating panel 30 is configured to include the display unit 31, the operating unit 32, a distance measuring unit 33, and a camera 34. The operating panel 30 is controlled by the CPU 11 or a CPU that is separately included in the operating panel 30.

The display unit 31 functions to display various types of operation screens and setting screens, etc. The display unit 31 is configured by a liquid crystal display (LCD), a driver therefor, etc. The operating unit 32 functions to receive various types of operations from the user. The operating unit 32 includes various types of hard switches (hard keys 36) such as a start button and a numeric keypad; and a touch panel 35 provided on a display surface of the display unit 31. The touch panel 35 detects a coordinate position where the display surface of the display unit 31 is touch-operated with a touch pen, a finger, etc.

The distance measuring unit 33 measures a distance to the portable terminal 40 that is present within a predetermined distance from the operating panel 30. For a method of measuring the distance, any known method may be used.

The camera 34 takes a photograph of a predetermined range around the image processing apparatus 10. Then, the CPU 11 analyzes an image obtained by the photographing, to recognize whether there is an object (here, the portable terminal 40) within the range. For example, the camera 34 takes a photograph of the front side (frontward) of the operating panel 30 in a range of about 150 degrees in a horizontal direction. The camera 34 and the CPU 11 serve as a position detecting unit of the present invention.

Note that there is a limit to a distance within which the image processing apparatus 10 can recognize that the portable terminal 40 is located in front of the front side of the operating panel 30. When the distance between the operating panel 30 and the portable terminal 40 exceeds the limit, the image processing apparatus 10 recognizes that the portable terminal 40 is not located in front of the front side of the operating panel 30.

In the embodiment of the present invention, the CPU 11 detects a free region on the display screen of the display unit 31. In addition, the CPU 11 inquires to the portable terminal 40 to obtain information on a free region on the display screen of the portable terminal 40. Then, when a substitute button display process is performed, the CPU 11 determines which free region is to be used as a substitute button display location. A determination method will be described later. The CPU 11 serves as a free region detecting unit of the present invention.

When the CPU 11 determines to use the free region on the display screen of the operating panel 30 as the substitute button display location, the CPU 11 displays substitute buttons in the free region. When the CPU 11 determines to use the free region on the display screen of the portable terminal 40 as the substitute button display location, the CPU 11 instructs the portable terminal 40 to display substitute buttons in the free region.

Figure 3:
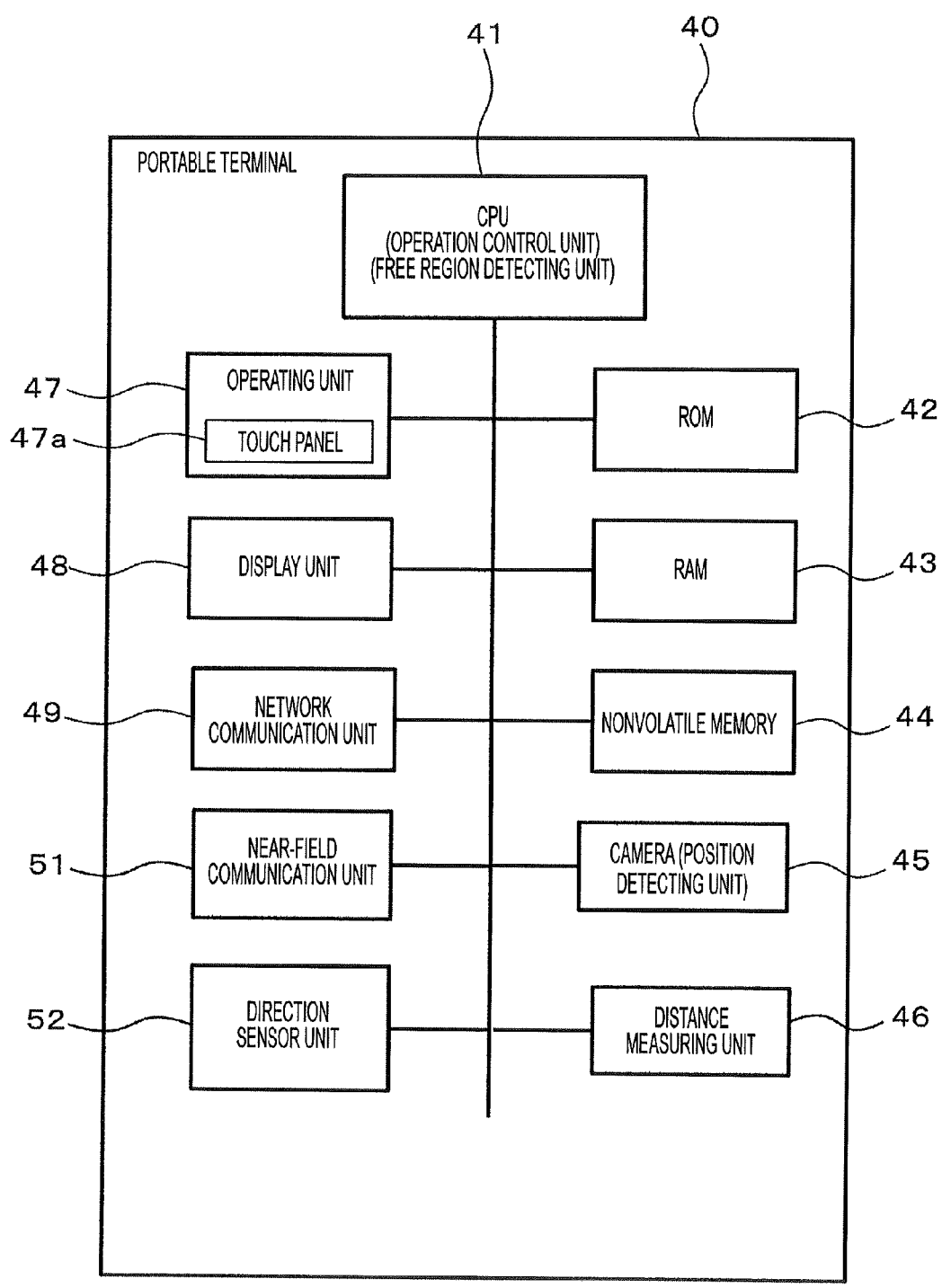
FIG. 3 is a block diagram showing a schematic configuration of a portable terminal.

FIG. 3 is a block diagram showing a schematic configuration of the portable terminal 40. The portable terminal 40 includes a CPU 41 that performs overall control of the operation of the portable terminal 40. To the CPU 41 are connected, through a bus, a ROM 42, a RAM 43, a nonvolatile memory 44, a camera 45, a distance measuring unit 46, an operating unit 47, the display unit 48, a network communication unit 49, a near-field communication unit 51, and a direction sensor unit 52.

The CPU 41 uses an Operating System (OS) program as a base program, and executes middleware, an application program, etc., on the OS program. The ROM 42 stores various types of programs. By the CPU 41 performing various types of processes according to the programs, the functions of the portable terminal 40 are implemented.

The RAM 43 is used as a working memory for temporarily storing various types of data when the CPU 41 performs processes based on a program, and storing display data.

The nonvolatile memory 44 is a memory (flash memory) whose stored content is not destructed even if power is turned off, and is used, for example, to save various types of setting information.

The display unit 48 functions to display various types of operation screens and setting screens. The display unit 48 is configured by a liquid crystal display, a driver therefor, etc. The operating unit 47 functions to receive various types of operations from an operator. The operating unit 47 includes a small number of hard switches; and a touch panel 47a provided on a display surface of the display unit 48.

The camera 45 takes a photograph in a direction of the line of sight of the user viewing the display unit 48 of the portable terminal 40, i.e., the back side of the display unit 48. The portable terminal 40 has a thin-plate form. Almost all of the front side of the portable terminal 40 serves as the display surface of the display unit 48. The camera 45 is provided outwardly on the back side (rear side) of the portable terminal 40 and takes a photograph from the back side of the portable terminal 40.

The distance measuring unit 46 measures a distance to the image processing apparatus 10 that is present within a predetermined distance from the portable terminal 40. For a method of measuring the distance, any known method may be used. Here, the distance measuring unit 46 measures a distance to the operating panel 30 present in the direction in which the camera 45 takes a photograph, i.e., on the back side of the portable terminal 40.

The network communication unit 49 functions to communicate with the image processing apparatus 10, an external PC, a server, etc. The near-field communication unit 51 performs near-field communication with an external apparatus such as the image processing apparatus 10. The communicable distance is, for example, within 15 cm.

The direction sensor unit 52 is configured by, for example, combining a plurality of geomagnetic sensors and a plurality of acceleration sensors. The direction sensor unit 52 detects the posture and angle of the portable terminal 40. In addition, the direction sensor unit 52 detects, when the portable terminal 40 is tilted or moved, the orientation and speed of the displacement and notifies the CPU 41 of detection results.

In the embodiment of the present invention, the CPU 41 detects a free region on the display screen of the display unit 48 and notifies the image processing apparatus 10 of information about the free region. In addition, when an operation is received by a substitute button displayed on the display screen of the display unit 48, the portable terminal 40 transmits the content of the operation to the image processing apparatus 10.

Next, specific examples will be described for the case in which the portable terminal 40 is brought close to the operating panel 30 and used, and the case in which substitute buttons are displayed by a substitute button display process.

Figure 4:
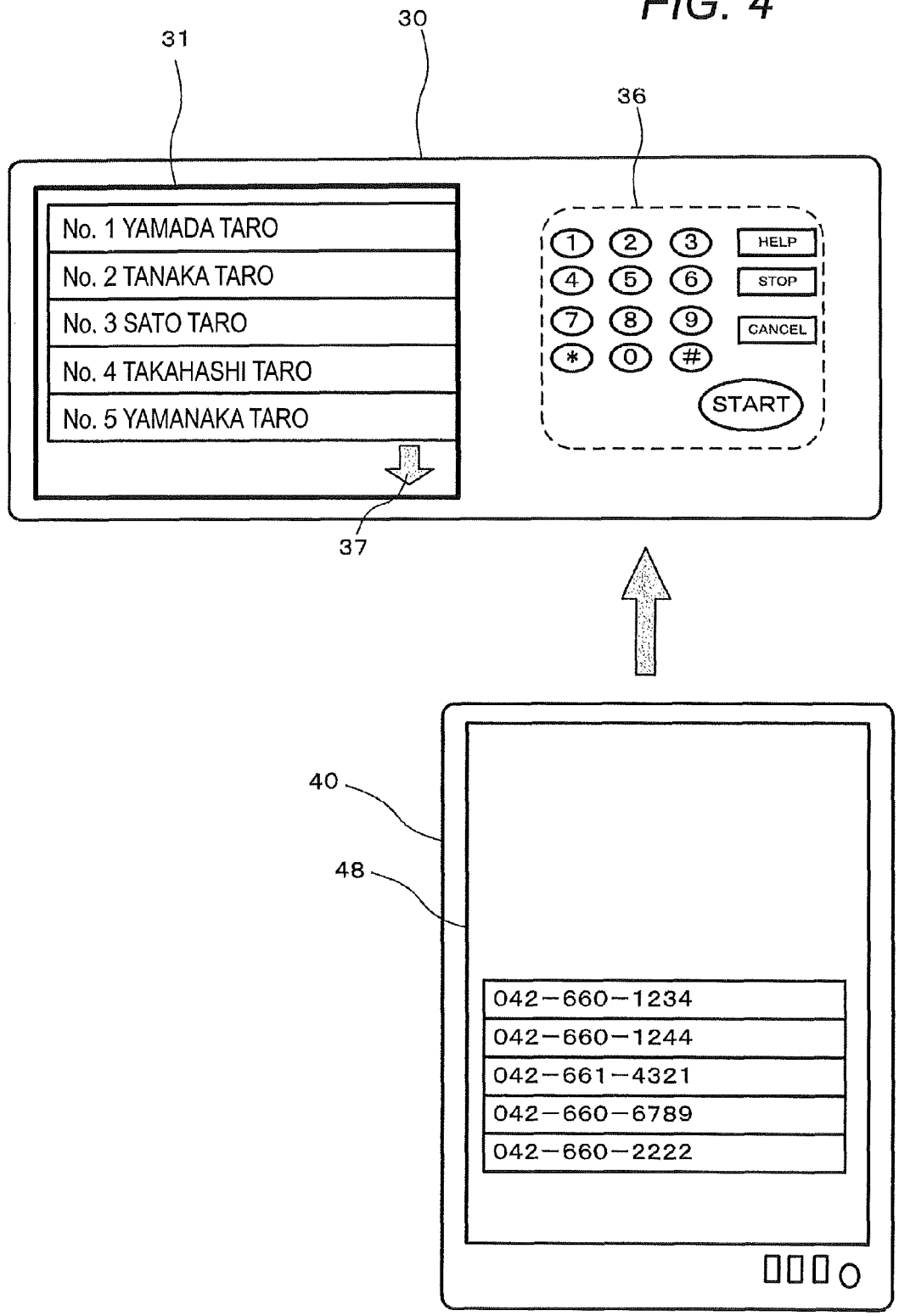
FIG. 4 is a diagram showing a state immediately before an operating panel and the portable terminal are placed on top of each other.

FIG. 4 shows a state in which the operating panel 30 is viewed from the front side thereof. In FIG. 4, on the front side of the operating panel 30, the display unit 31 (touch panel 35) is arranged on the left side when viewed from the user, and the hard keys 36 are arranged on the right side. Note that a soft key 37 is displayed at a bottom-right portion of the display unit 31 (touch panel 35). Here, the hard keys 36 and the soft key 37 (an operating button displayed on the touch panel 35) form the operating unit 32.

In the embodiment of the present invention, as an example of cooperative operation, the aforementioned conjunction display is performed. When conjunction display is performed, the user places the display unit 48 of the portable terminal 40 on the right of the display unit 31 so that he/she can view both of the display unit 31 and the display unit 48 at a time. However, since the hard keys 36 are mounted on the right of the display unit 31, when the user brings the portable terminal 40 close to the right of the display unit 31, i.e., near the hard keys 36, he/she cannot perform operations on the hard keys 36.

Figure 5:
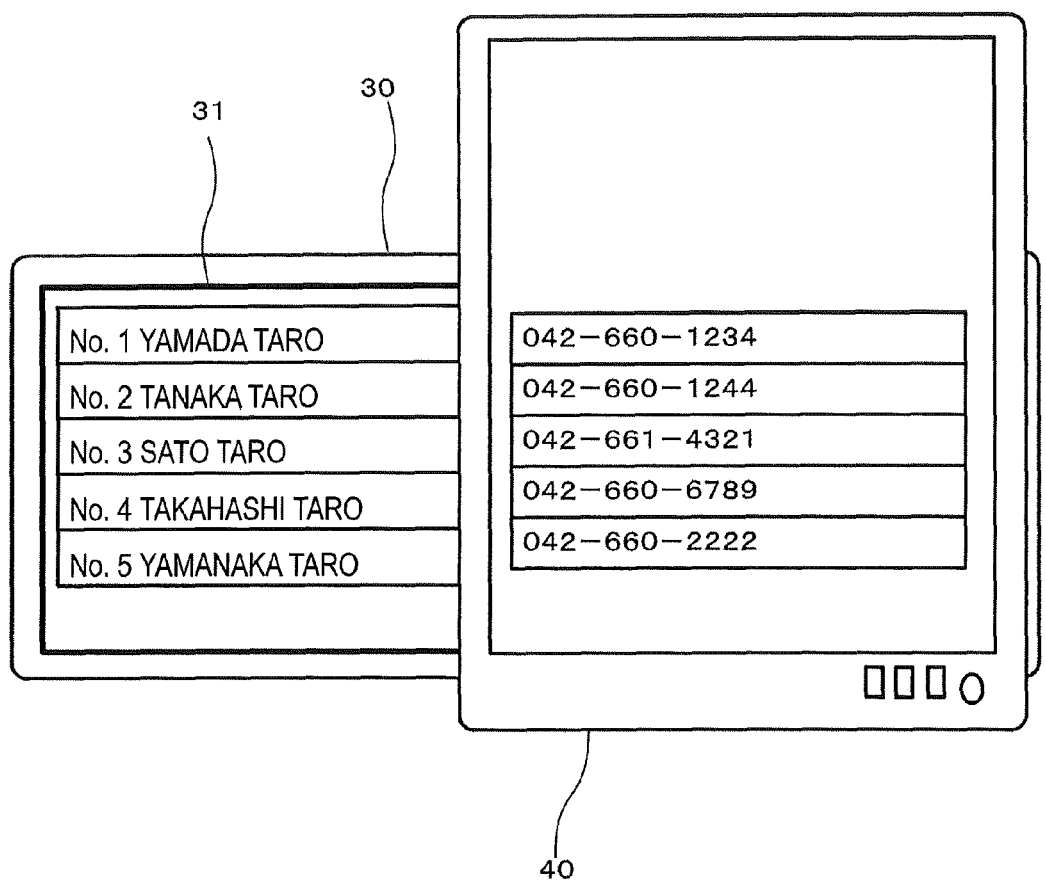
FIG. 5 is a diagram showing a state of when the operating panel and the portable terminal are placed on top of each other.

FIG. 5 shows a state of when the portable terminal 40 is brought close to the operating panel 30. In FIG. 5, the portable terminal 40 is located in front of the front side of the hard keys 36 and the soft key 37 (operating unit 32). Hence, both of the hard keys 36 and the soft key 37 are hidden by the portable terminal 40 and thus cannot be seen from the user (it is difficult to perform operations on both of the hard keys 36 and the soft key 37).

Figure 6:
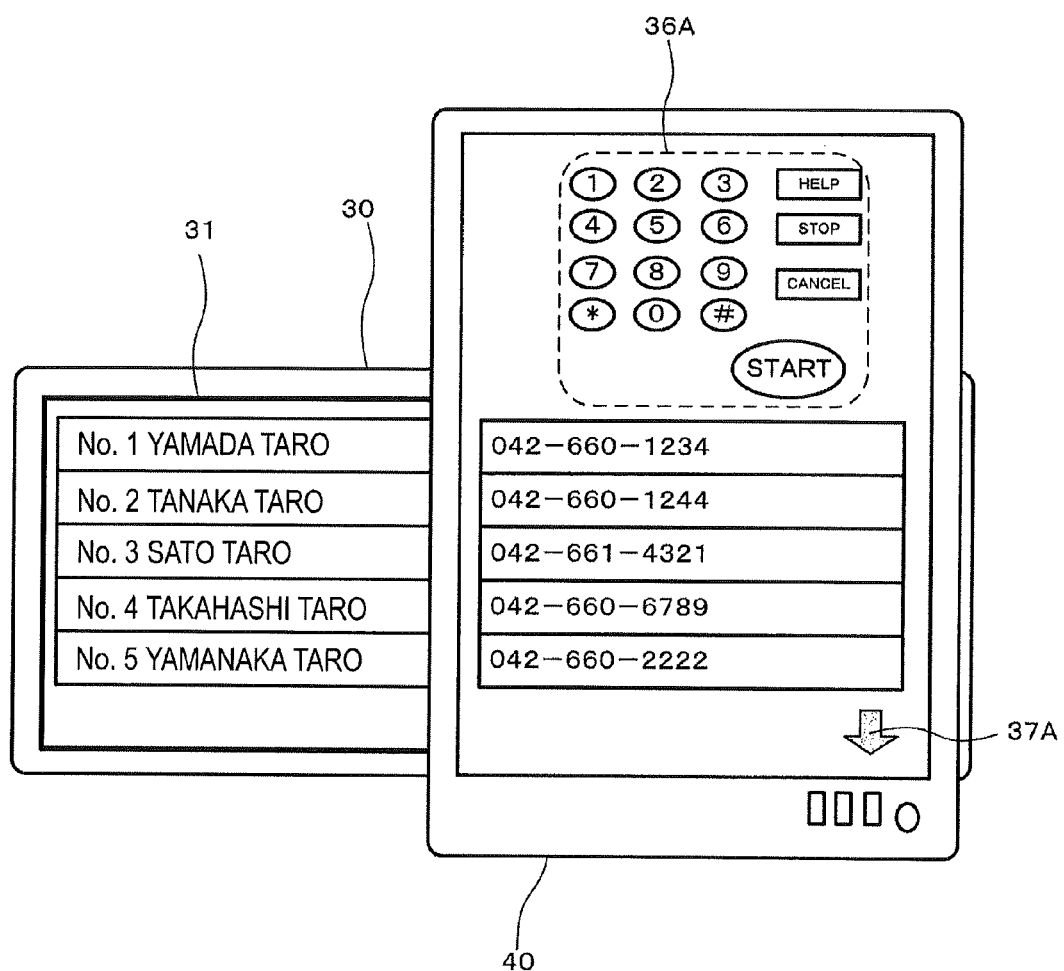
FIG. 6 is a diagram showing a state of when an image of substitute buttons is displayed on the portable terminal.

FIG. 6 shows an example of the case in which a substitute button display process is performed in the state of FIG. 5. In FIG. 6, a free region of the portable terminal 40 is used as a substitute button display location. On the display screen of the portable terminal 40, a list of telephone numbers (the telephone numbers are displayed left-aligned) is displayed at a central portion, and the top and bottom portions of the display screen are free regions. Substitute buttons 36A for the hard keys 36 are displayed in the free region at the top portion of the display screen, and a substitute button 37A for the soft key 37 is displayed in the free region at the bottom portion of the display screen.

When the portable terminal 40 accepts an operation performed on the substitute buttons 36A or the substitute button 37A, the portable terminal 40 notifies the image processing apparatus 10 of the content of the operation accepted. Then, the image processing apparatus 10 accepts the content of the operation indicated by the notification, as an operation accepted by the operating unit 32. By this, even when the user cannot perform operations on the hard keys 36 or the soft key 37 which are hidden behind the portable terminal 40, he/she can perform the same operations as those performed on the hard keys 36 or the soft key 37, on the substitute buttons 36A or the substitute button 37A. Note that in the embodiment of the present invention, a substitute button display process is operational during cooperative operation and is not operational in a state in which conjunction operation is not performed.

Note that although in FIG. 6 the CPU 11 detects, as free regions, only the top and bottom portions of the display screen of the portable terminal 40, the CPU 11 may also detect, as a free region, a region that does not particularly include text information, etc., such as a right-side portion of the list of telephone numbers.

Six exemplary modes for the case of performing a substitute button display process are shown below.

Exemplary Mode 1

In Exemplary mode 1, when substitute buttons are displayed, the substitute buttons are displayed in a position on a display screen that corresponds to the front of the front side of the original operating buttons as much as possible. Specifically, the CPU 11 obtains information on a free region of the portable terminal 40. When a position corresponding to the front of the front side of operating buttons whose image is planned to be displayed as substitute buttons is the free region, the CPU 11 displays substitute buttons in the position.

Figure 7:
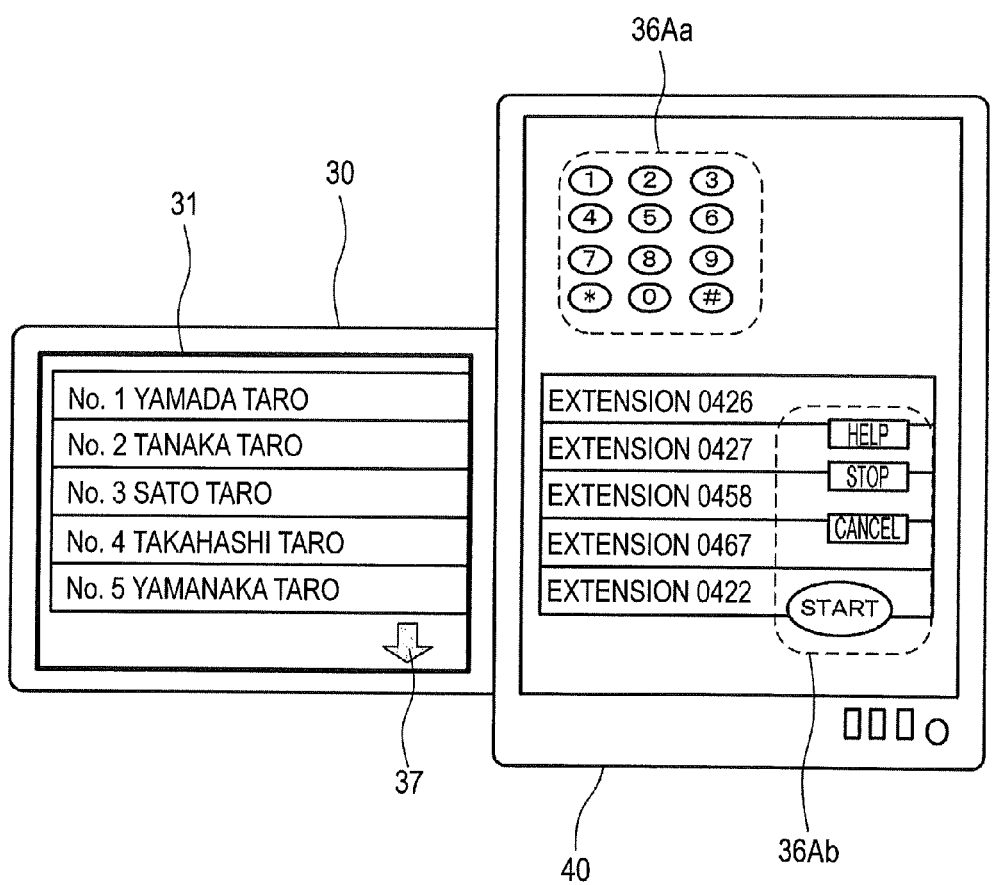
FIG. 7 is a diagram showing a state of when some of a plurality of substitute buttons are displayed in positions on a display screen corresponding to the front of the front side of the original operating buttons.

FIG. 7 shows a specific example of substitute buttons displayed by a substitute button display process in Exemplary mode 1. In FIG. 7, substitute buttons 36A (36Aa and 36Ab) for the hard keys 36 are displayed on the portable terminal 40.

In FIG. 7, the substitute buttons 36Aa corresponding to a numeric keypad portion of the hard keys 36 and the substitute buttons 36Ab corresponding to the other portion (a start key, etc.) are displayed in different free regions.

In FIG. 7, telephone numbers are displayed in a position on the display screen of the portable terminal 40 that corresponds to the front of the front side of the numeric keypad portion, and thus the position is not a free region. Hence, the substitute buttons 36Aa corresponding to the numeric keypad portion are displayed in a free region present at a top portion of the display screen.

A position (a middle right portion) on the display screen of the portable terminal 40 that corresponds to the front of the front side of a portion other than the numeric keypad is a free region. Thus, the substitute buttons 36Ab corresponding to the portion other than the numeric keypad are displayed in the position.

As shown in FIG. 7, the hard keys 36 and the soft key 37 may be divided into a plurality of groups and it may be determined on a group-by-group basis whether substitute buttons can be displayed in a position corresponding to the front of the front side of the original operating buttons (whether there is a free region). Alternatively, only when substitute buttons for all operating buttons can be displayed in a position corresponding to the front of the front side, the substitute buttons may be displayed in the position.

As such, in Exemplary mode 1, substitute buttons are displayed in a position on the display screen that corresponds to the front of the front side of the original operating buttons. Since the substitute buttons are displayed in the same position as that of the arrangement of the operating buttons on the operating panel 30, the user can save time and trouble to find substitute buttons corresponding to the original operating buttons, improving operability.

Exemplary Mode 2

In Exemplary mode 2, the case will be described in which a distance from the operating panel 30 to the portable terminal 40 is calculated and only when the distance is less than a predetermined value, a substitute button display process is performed.

The operation display system 5 determines whether the distance between the operating panel 30 and the portable terminal 40 is greater than or equal to a predetermined value. For example, it is determined whether the distance is less than the predetermined value by the following methods, etc.

Method 1: It is determined that the distance is less than the predetermined value when communication by the near-field communication unit 23 and the near-field communication unit 51 can be performed. If the communication cannot be performed, it is determined that the distance is greater than or equal to the predetermined value. Note that when this method is adopted, the shortest distance where communication by the near-field communication unit 23 and the near-field communication unit 51 cannot be performed is set as the predetermined value.

Method 2: An image photographed by the camera 34 is analyzed to calculate, by the distance measuring unit 33, a distance from the operating panel 30 to the portable terminal 40, and it is determined whether the calculated distance is less than the predetermined value.

For a method of determining a distance between the operating panel 30 and the portable terminal 40, methods other than the above-described Method 1 and Method 2 may be used.

Figure 8:
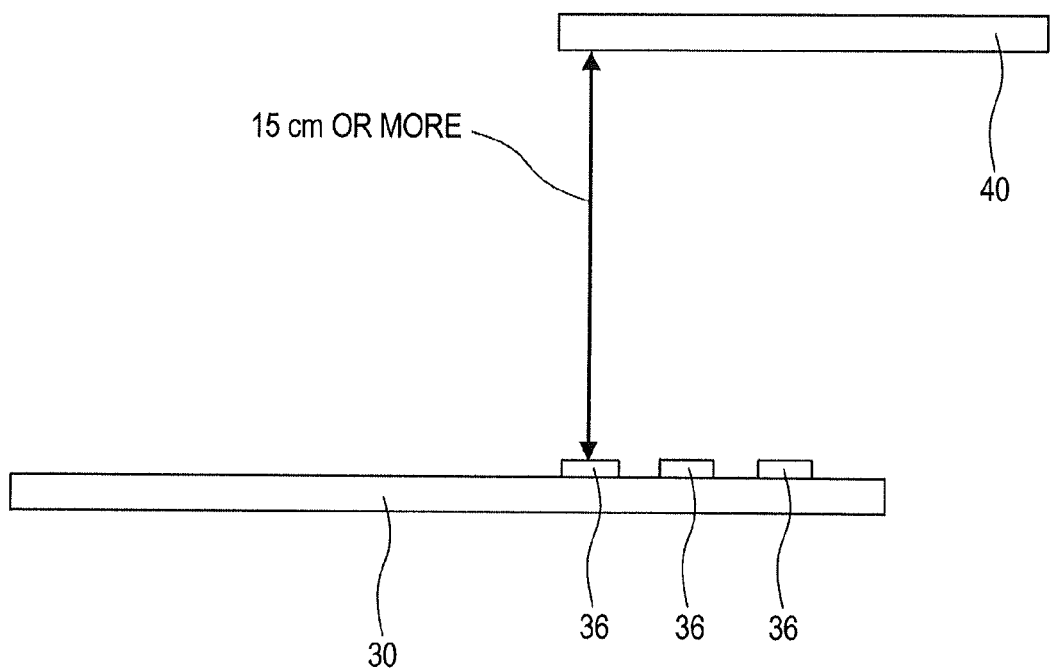
FIG. 8 is a diagram showing a state of when the operating panel and the portable terminal are away from each other.
Figure 9:
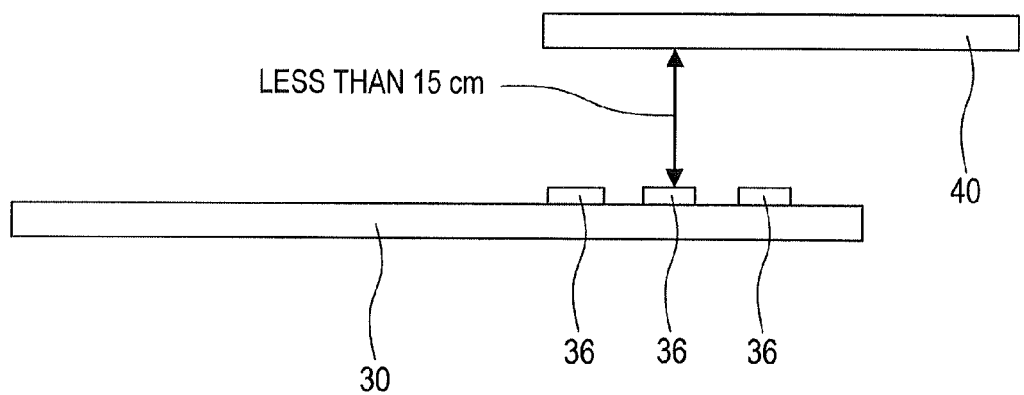
FIG. 9 is a diagram showing a state of when the portable terminal is located near the operating panel.

FIGS. 8 and 9 show examples of the case in which the portable terminal 40 is located on the front side of the operating panel 30. FIG. 8 shows the case in which the distance from the operating panel 30 to the portable terminal 40 is 15 cm or more, and FIG. 9 shows the case in which the distance from the operating panel 30 to the portable terminal 40 is less than 15 cm.

When the predetermined value is 15 cm, since in FIG. 8 the distance between the operating panel 30 and the portable terminal 40 is 15 cm or more, i.e., greater than or equal to the predetermined value, even if the portable terminal 40 is located on the front side of the operating panel 30, a substitute button display process is not performed.

When the predetermined value is 15 cm, since in FIG. 9 the distance between the operating panel 30 and the portable terminal 40 is less than 15 cm, i.e., less than the predetermined value, when the portable terminal 40 is located on the front side of the operating panel 30, a substitute button display process is performed.

The predetermined value may be a preset value or may be changeable by the user.

As such, in Exemplary mode 2, even if the portable terminal 40 is located on the front side of the operating panel 30, depending on whether the distance between the operating panel 30 and the portable terminal 40 is less than the predetermined value, whether to perform a substitute button display process is switched. By moving the portable terminal 40 away from the operating panel 30, the hard keys 36 and the soft key 37 can be used instead of the substitute buttons (36A and 37A), and thus, user's usability improves.

Exemplary Mode 3

In Exemplary mode 3, when a substitute button display process is performed, acceptance of operations by operating buttons (the hard keys 36 and the soft key 37) corresponding to substitute buttons is invalidated.

When the portable terminal 40 is located in front of the front side of the operating panel 30, the operating unit 32 (e.g., the hard keys 36 and the soft key 37) are hidden by the portable terminal 40 when viewed from the user of the portable terminal 40. Thus, the user has difficulty in performing operations on the operating unit 32, and the portable terminal 40 or a hand holding the portable terminal 40 may touch the operating unit 32, which may cause erroneous operations. Hence, when a substitute button display process is performed, i.e., when the portable terminal 40 is located in front of the front side of the operating unit 32, acceptance of operations by the operating unit 32 is invalidated. By this, when the portable terminal 40 is brought close to the operating unit 32 and used, the occurrence of erroneous operations caused by the portable terminal 40 or the hand holding the portable terminal 40 touching the operating unit 32 can be prevented.

Note that acceptance of operations by all operating buttons (the hard keys 36 and the soft key 37) of the operating unit 32 may be invalidated during display of substitute buttons, but in the embodiment of the present invention, acceptance of operations only by original operating buttons corresponding to substitute buttons displayed is invalidated.

Exemplary Mode 4

Exemplary mode 4 describes how to determine, when there are a plurality of free regions on the display screens of the display unit 31 and the portable terminal 40, any of the free regions as a free region where substitute buttons are to be displayed.

The image processing apparatus 10 has an automatic arrangement mode which is an operating mode for automatically determining a free region where substitute buttons are to be displayed, when there are a plurality of free regions. The image processing apparatus 10 can switch the mode between on and off. When the automatic arrangement mode is on, the image processing apparatus 10 automatically determines a free region where substitute buttons are to be displayed. When the automatic arrangement mode is off, the image processing apparatus 10 receives selection of a free region from the user and determines the selected free region as a free region where substitute buttons are to be displayed. The user can switch the automatic arrangement mode between on and off.

(When the Automatic Arrangement Mode is on)

Figure 10:
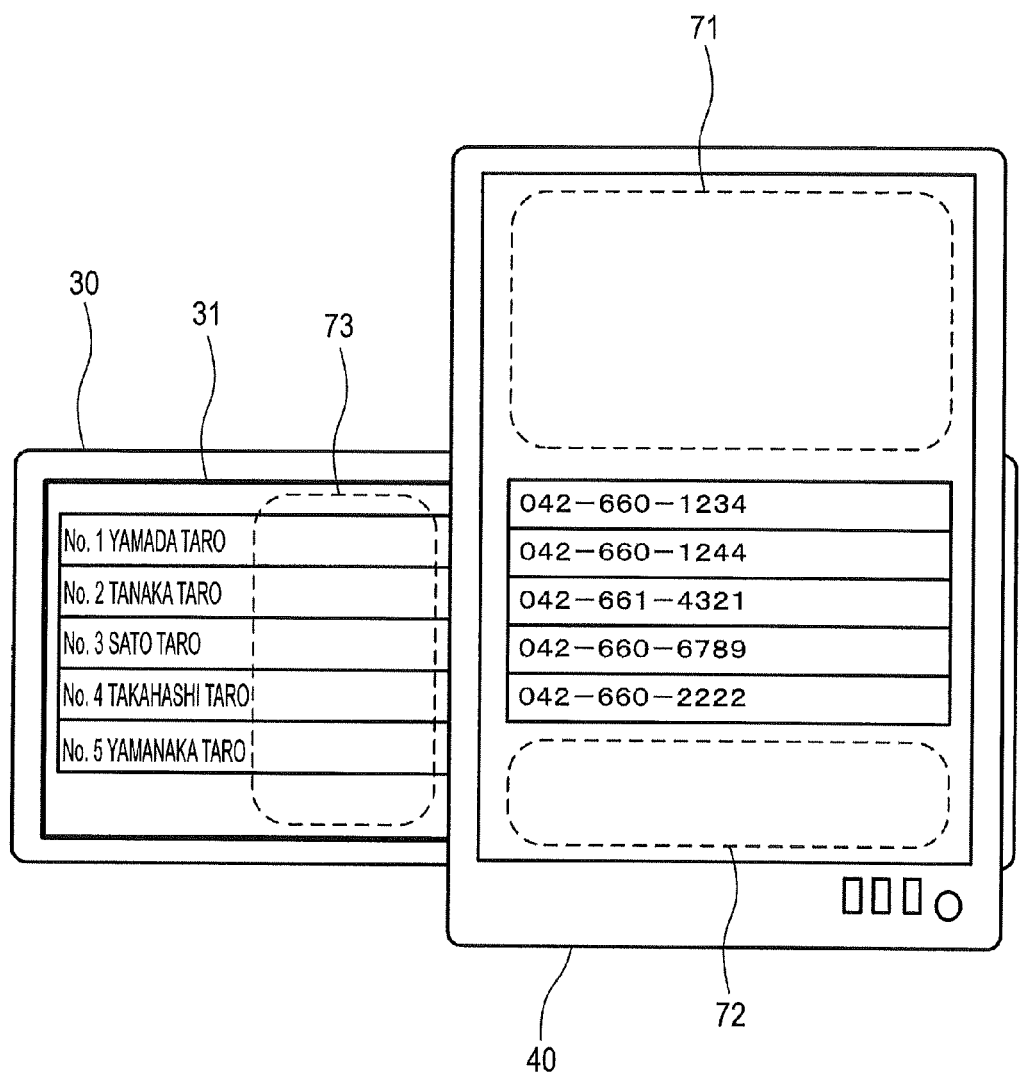
FIG. 10 is a diagram showing free regions on the operating panel and the portable terminal.

FIG. 10 shows the case in which there are three free regions (71 to 73) on the display screens of the display unit 31 and the portable terminal 40. In FIG. 10, the free region 71 is present at a top portion of the display screen of the portable terminal 40, the free region 72 is present at a bottom portion of the display screen of the portable terminal 40, and the free region 73 is present at a right portion of the display screen of the display unit 31. The sizes (areas) of the free regions are such that the free region 71>the free region 73>the free region 72.

When the automatic arrangement mode is on, the image processing apparatus 10 determines, for example, a free region with the largest area or a minimum free region that can hold substitute buttons planned to be displayed, as a free region where substitute buttons are to be displayed. A free region may be determined by other criteria. For example, if substitute buttons can be displayed in a position on a display screen that corresponds to the front of the front side of the original operating buttons, then a free region in the position is determined as a substitute button display location. If substitute buttons cannot be displayed in the position, a free region closest to the position or the largest free region is determined as a substitute button display location.

(When the Automatic Arrangement Mode is Off)

Figure 11:
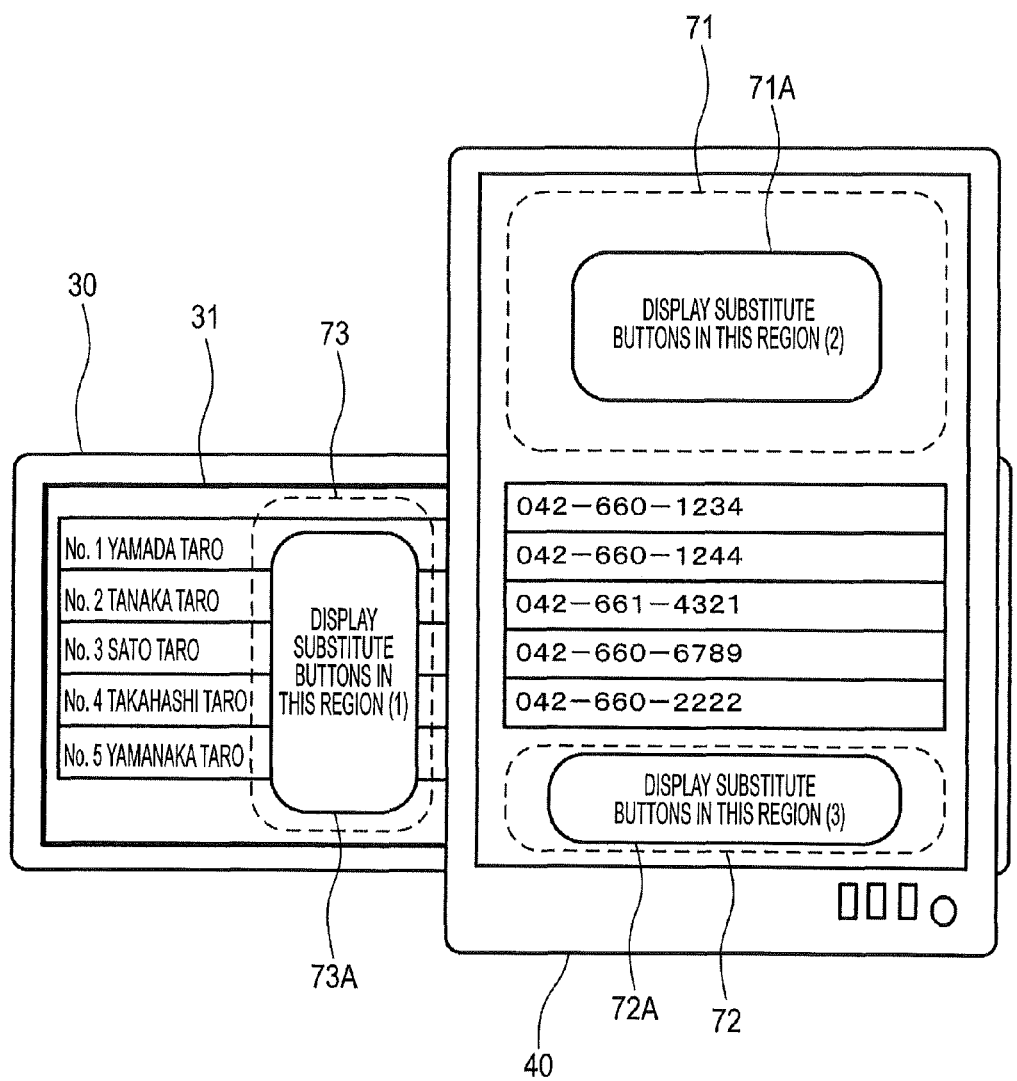
FIG. 11 is a diagram showing a state of when selection of a free region where substitute buttons are to be displayed is received.

FIG. 11 shows a state in which, when there are three free regions (71 to 73) on the display screens of the display unit 31 and the portable terminal 40, selection of a free region is received from the user. When the operation display system 5 displays substitute buttons, the operation display system 5 notifies the user of the location of each free region, and receives selection from the user. In FIG. 11, selection buttons (71A to 73A) are displayed in free region (71 to 73) portions. When any of the selection buttons is selected, a free region having the selected selection button displayed therein is determined as a free region where substitute buttons are to be displayed.

Exemplary Mode 5

In Exemplary mode 5, the case will be described in which substitute buttons are scaled down and displayed in a free region. For example, in the operation display system 5, a substitute button is an image of basically the same size as the original operating button. However, when the area of a free region is smaller than the area required to display substitute buttons, the image processing apparatus 10 scales down the substitute buttons and displays the scaled-down substitute buttons in the free region.

By this, even if the size of a free region is small, substitute buttons can be displayed. Note that, in addition to the scaling down of substitute buttons, when there are a plurality of substitute buttons, the spacings therebetween may be reduced, by which the space required to display may be reduced.

Note that in Exemplary mode 5, when the area of a free region is larger than the original operating buttons, substitute buttons corresponding to the operating buttons may be scaled up and displayed in the free region. In addition, here, the scale-down/up percentage of the original operating buttons corresponding to the substitute buttons may be displayed. In addition, a preview image for when the substitute buttons are scaled down/up relative to the original operating buttons may be displayed to allow the user to determine whether to perform scaling down/up.

Exemplary Mode 6

In Exemplary mode 6, the case of displaying only some of a plurality of substitute buttons will be described. For example, in the operation display system 5, when a free region for displaying a plurality of substitute buttons is insufficient, only substitute buttons corresponding to operating buttons which are used for operations for content being displayed are displayed in the free region.

Figure 12:
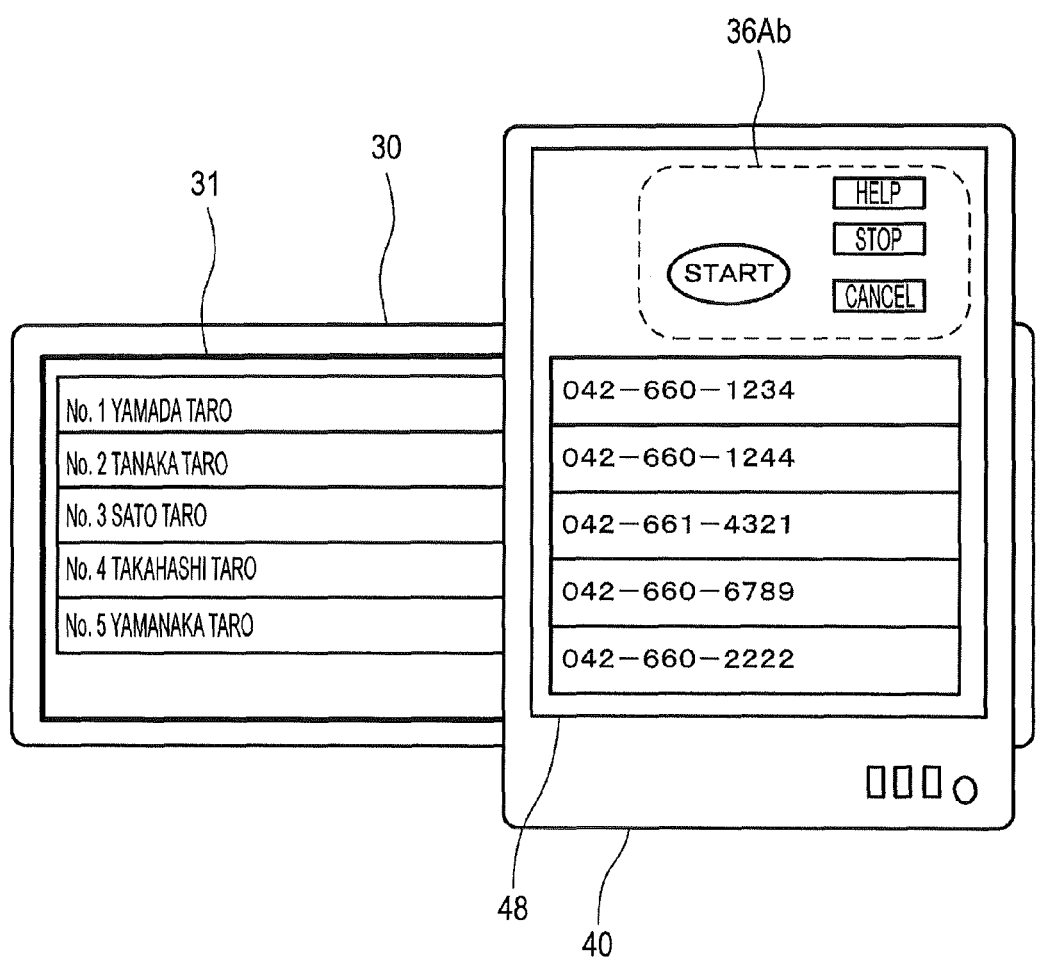
FIG. 12 is a diagram showing a state of when, of a plurality of substitute buttons, substitute buttons required for operations performed on a screen being displayed are displayed on a priority basis.

FIG. 12 shows a state of when only some substitute buttons (substitute buttons 36Ab) are displayed in a free region. In FIG. 12, information about FAX transmission destinations is displayed on the display unit 31 and the display unit 48. By the user selecting a destination on the screen and pressing a start button, the image processing apparatus 10 starts FAX transmission. Namely, in the state of FIG. 12, since the user does not need to newly input the number of the FAX transmission destination, substitute buttons 36Aa corresponding to the numeric keypad are not displayed, but the substitute buttons 36Ab corresponding to other operating buttons (a start key, etc.) are displayed in the free region.

As such, the image processing apparatus 10 determines whether the operating buttons hidden by the portable terminal 40 are operating buttons that can be used for operations performed on a screen being displayed. Then, the image processing apparatus 10 displays substitute buttons for only operating buttons determined to be the buttons that can be used, in a free region. The above-described determination is made, for example, such that a priority according to the magnitude of the possibility of use on a screen being displayed is set on each operating button (the hard keys 36 and the soft key 37), and substitute buttons to be displayed in a free region are determined based on the priorities.

By this, even if the size of a free region is small, substitute buttons corresponding to operating buttons used by the user are displayed, and thus, user's usability is ensured.

Note that only operating buttons having priorities greater than or equal to a certain level may be displayed in the free region, or operating buttons having priorities less than or equal to a certain level may also be displayed in the free region, provided that the free region can hold the operating buttons. When the free region cannot hold the operating buttons having priorities greater than or equal to a certain level, substitute buttons for the operating buttons having priorities greater than or equal to a certain level are scaled down and displayed. The priority may have two or more levels. In the case of two levels, only "display" and "not display" are set. A selection of some substitute buttons to be displayed in the free region may be made based on other criteria.

Figure 13:
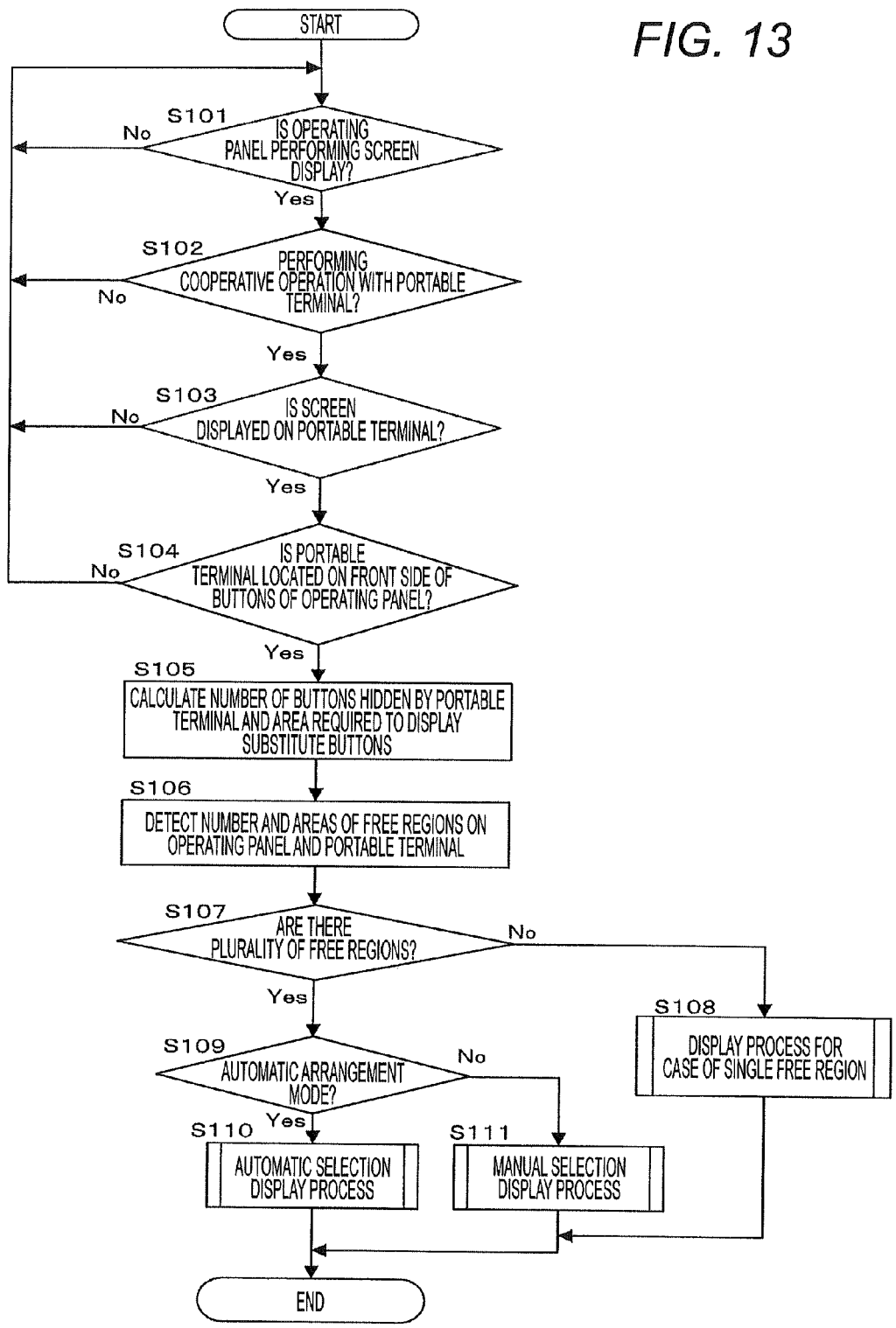
FIG. 13 is a flowchart showing a process performed by the image processing apparatus.

Next, the flow of a process for when the operation display system 5 performs a substitute button display process will be described. FIG. 13 shows the flow of a process for when the operation display system 5 performs a substitute button display process.

First, if the operating panel 30 is not performing screen display (step S101; No), processing returns to step S101 and the process continues. If the operating panel 30 is performing screen display (step S101; Yes), it is checked whether the image processing apparatus 10 is performing cooperative operation with the portable terminal 40 (step S102).

If the image processing apparatus 10 is not performing cooperative operation (step S102; No), processing returns to step S101 and the process continues. If the image processing apparatus 10 is performing cooperative operation (step S102; Yes), it is checked whether the portable terminal 40 is performing screen display (step S103).

If the portable terminal 40 is not performing screen display (step S103; No), processing returns to step S101 and the process continues. If the portable terminal 40 is performing screen display (step S103; Yes), it is checked whether the portable terminal 40 is located in front of the front side of the operating unit 32 (step S104).

If the portable terminal 40 is not located in front of the front side of the operating unit 32 (step S104; No), processing returns to step S101 and the process continues. If the portable terminal 40 is located in front of the front side of the operating unit 32 (step S104; Yes), the number of operating buttons, in front of the front side of which the portable terminal 40 is located (hidden by the portable terminal 40), and an area required to display substitute buttons are calculated (step S105).

Then, the number and areas of free regions on the display screens of the operating panel 30 and the portable terminal 40 are detected (step S106). If there is a single free region (step S107; No), substitute buttons are displayed in the free region by a display process for the case of a single free region (step S108), and the process ends.

If there are a plurality of free regions (step S107; Yes) and if the automatic arrangement mode is on (step S109; Yes), substitute buttons are displayed in a free region by an automatic selection display process (step S110), and the process ends. If the automatic arrangement mode is off (step S109; No), substitute buttons are displayed in a free region by a manual selection display process (step S111), and the process ends.

When the free region serving as a substitute button display location at steps S108, S110, and S111 is a free region on the display screen of the operating panel 30, the CPU 11 displays substitute buttons in the free region. When the free region serving as the substitute button display location is a free region on the display screen of the portable terminal 40, the CPU 11 transmits an instruction to display substitute buttons in the free region, to the portable terminal 40.

It may be checked at step S104 whether the distance between the portable terminal 40 and the operating panel 30 is less than a predetermined value. If the distance is greater than or equal to the predetermined value, then even if the portable terminal 40 is located in front of the front side of the operating panel 30, processing may return to step S101 and the process continues.

Note that the process of FIG. 13 is repeatedly performed. In the embodiment of the present invention, detection of the areas and number of free regions, operating buttons hidden by the portable terminal 40, etc., is repeatedly performed. If there is a change, content to be displayed in a free region is changed according to the change. By this, even when the portable terminal 40 is moved or when the display content of the operating panel 30 and the display content of the portable terminal 40 are changed, for example, substitute buttons are always displayed in a suitable position.

Figure 14:
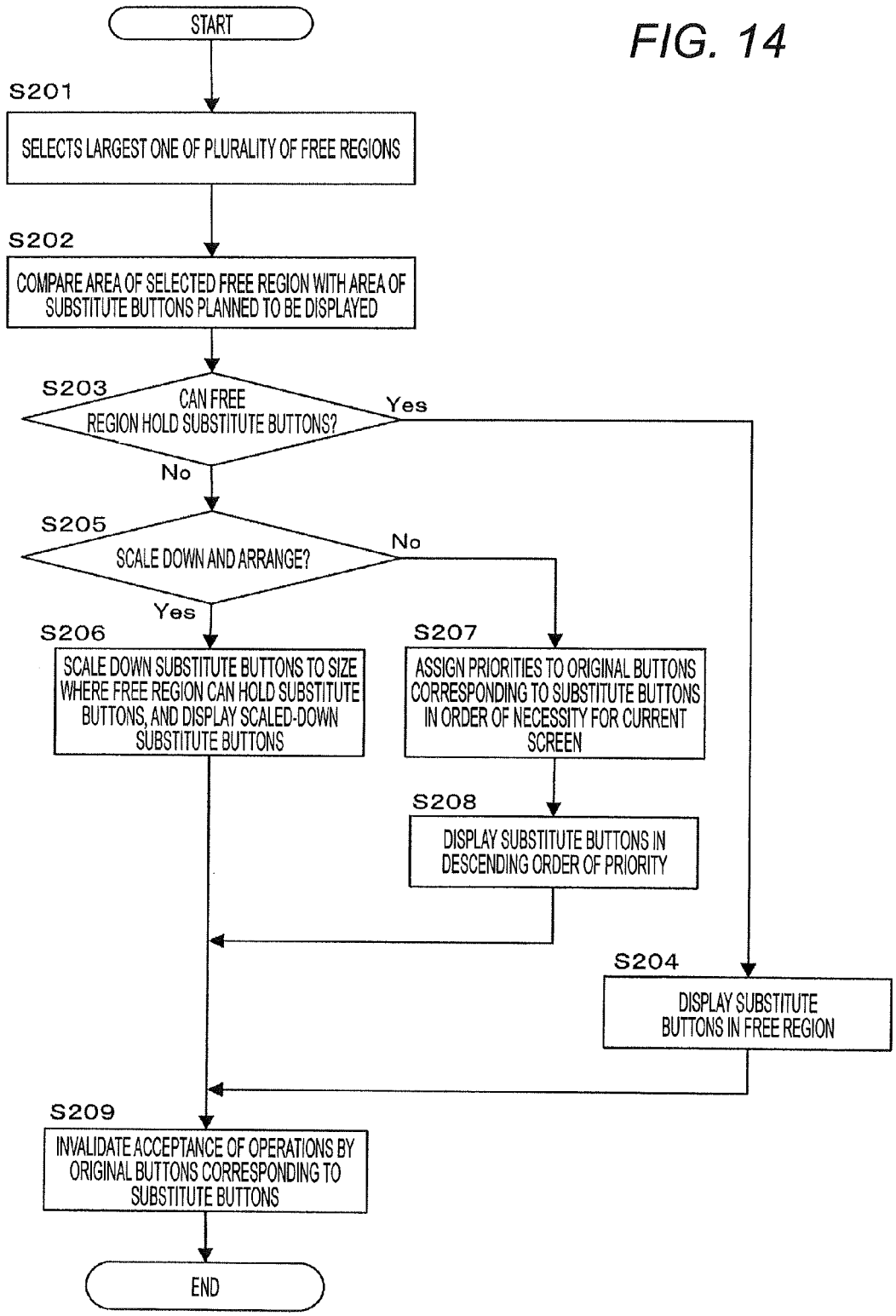
FIG. 14 is a flowchart showing a process of automatically selecting a free region and arranging substitute buttons.

FIG. 14 shows the flow of the automatic selection display process performed at step S110 of FIG. 13. First, the image processing apparatus 10 selects a free region with the largest area from among the plurality of free regions (step S201).

Then, the area of the selected free region is compared with the area of substitute buttons planned to be displayed (step S202). Then, if the free region can hold the substitute buttons (step S203; Yes), the substitute buttons are displayed in the free region (step S204), and processing proceeds to step S209. Note that here, when the free region is larger in area than the substitute buttons planned to be displayed, the substitute buttons planned to be displayed may be scaled up and displayed. Whether to scale up the substitute buttons planned to be displayed when the free region is larger in area than the substitute buttons planned to be displayed may be preset by the user or may be selected by the user every time.

If the free region cannot hold the substitute buttons (step S203; No), it is checked whether to scale down the substitute buttons (step S205). Whether to scale down the substitute buttons when the free region cannot hold the substitute buttons may be preset by the user or may be selected by the user every time.

If scaling down of the substitute buttons is performed (step S205; Yes), the substitute buttons are scaled down and displayed such that the free region selected at step S201 can hold the substitute buttons (step S206), and processing proceeds to step S209.

If scaling down of the substitute buttons is not performed (step S205; No), priorities are set on operating buttons corresponding to the substitute buttons in order of necessity, according to a screen being displayed (step S207). Then, only substitute buttons that can be held in the free region selected at step S201 are displayed in descending order of priority (step S208). When acceptance of operations by the original operating buttons corresponding to the substitute buttons is invalidated (step S209), the process ends.

Figure 15:
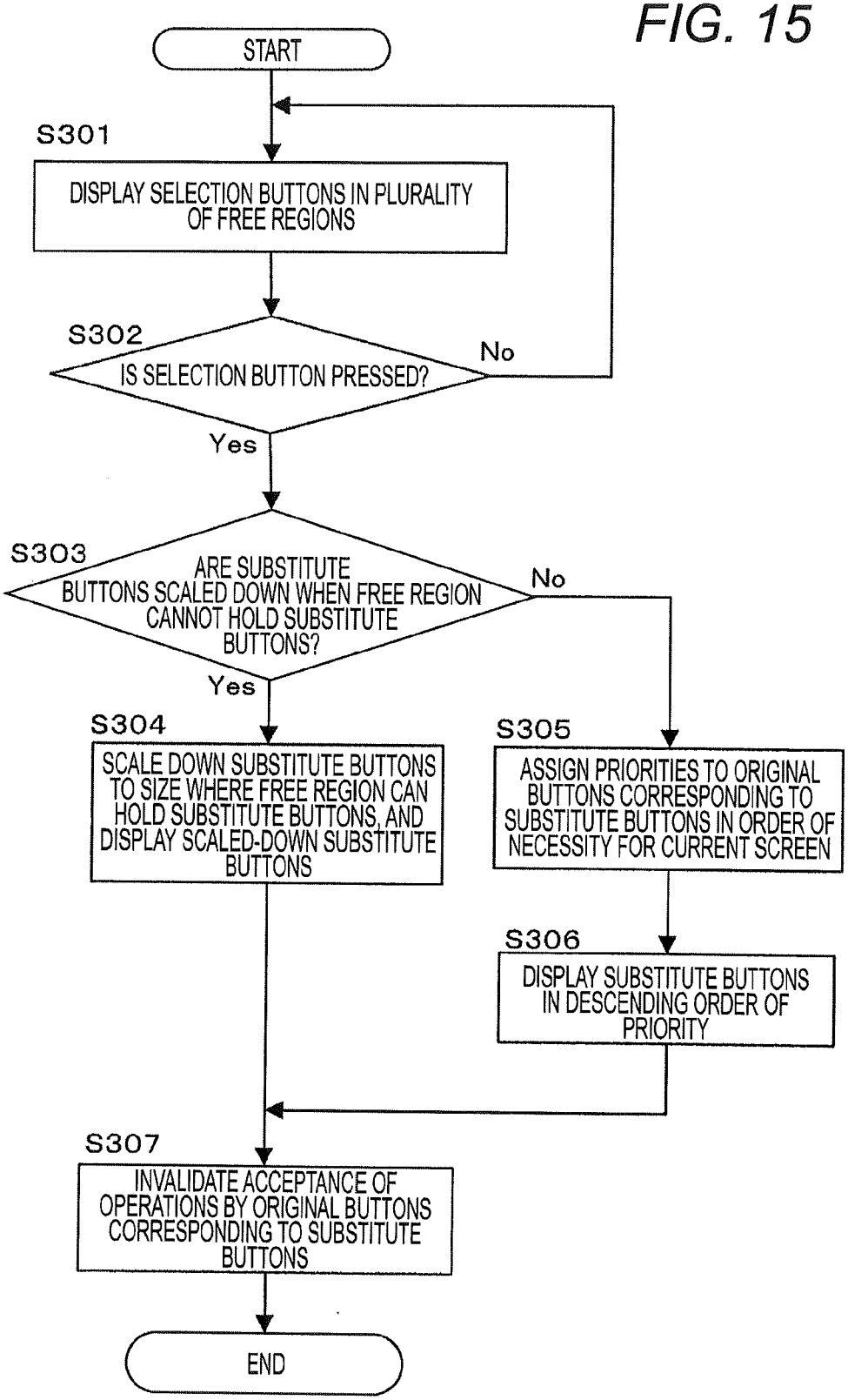
FIG. 15 is a flowchart showing a process of receiving selection of a free region and arranging substitute buttons.

FIG. 15 shows the flow of the manual selection display process performed at step S111 of FIG. 13. First, the image processing apparatus 10 displays selection buttons in the plurality of free regions (step S301). If there is a free region on the display screen of the portable terminal 40, the image processing apparatus 10 instructs to display a selection button in the free region.

Until any of the selection buttons is selected (step S302; No), processing returns to step S301 and the process continues. Note that if any of the selection buttons is pressed, the portable terminal 40 notifies the image processing apparatus 10 of the pressing of the selection button.

If any of the selection buttons is pressed (step S302; Yes), it is checked whether to scale down substitute buttons when a free region planned to be displayed cannot hold the substitute buttons (step S303). It is assumed that setting as to whether to scale down the substitute buttons when the free region planned to be displayed cannot hold the substitute buttons is performed in advance.

If the setting is to scale down the substitute buttons (step S303; Yes), then when the free region cannot hold the substitute buttons, the substitute buttons are scaled down and displayed, and when the free region can hold the substitute buttons, the substitute buttons is displayed without being scaled down (step S304), and processing proceeds to step S307.

If the setting is not to scale down the substitute buttons (step S303; No), priorities are set on operating buttons corresponding to the substitute buttons in order of necessity, according to a screen being displayed (step S305). Then, only substitute buttons that can be held in the free region having displayed therein the selection button pressed at step S302 are displayed in descending order of priority (step S306). When acceptance of operations by the original operating buttons corresponding to the substitute buttons displayed is invalidated (step S307), the process ends.

Figure 16:
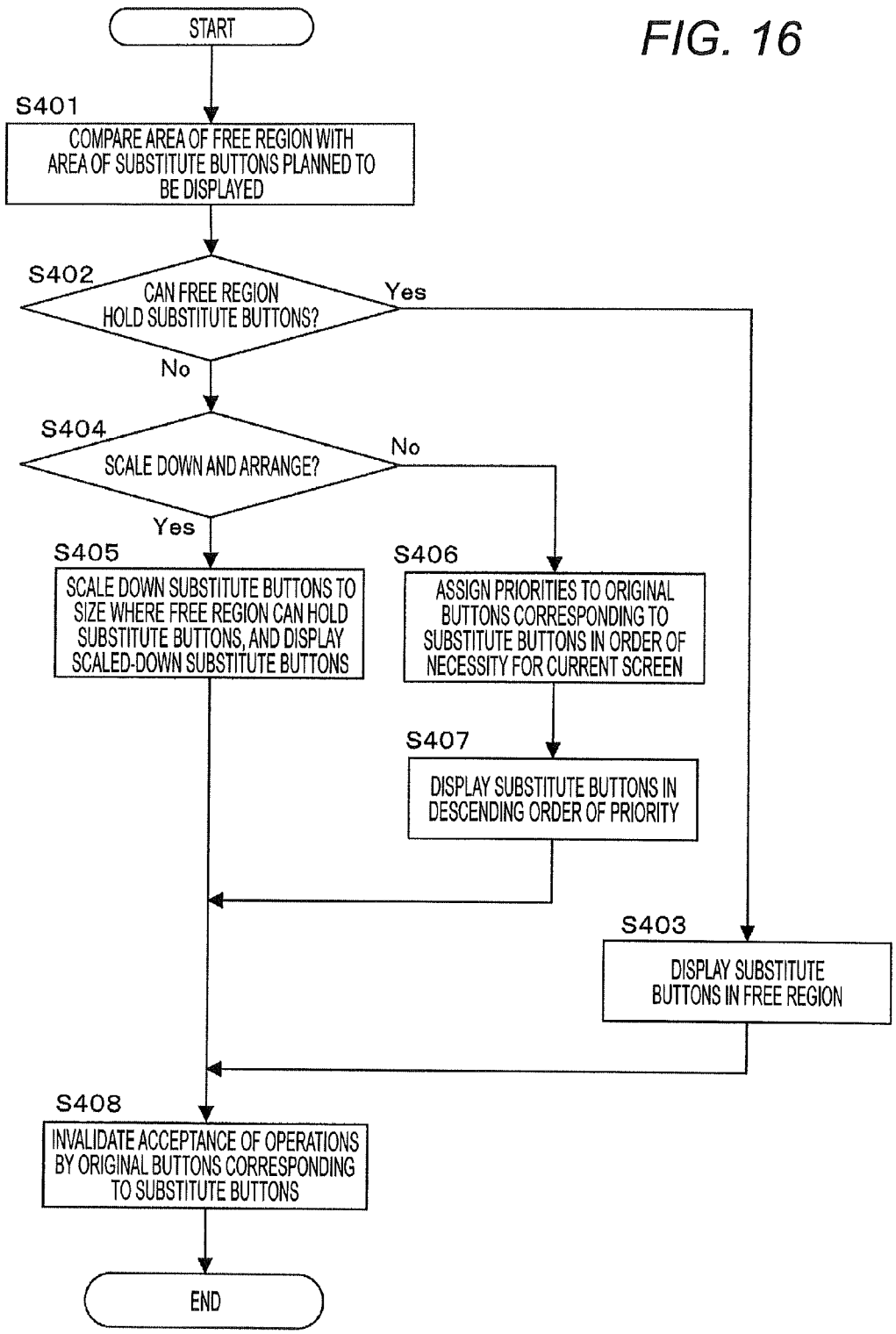
FIG. 16 is a flowchart showing a process of arranging substitute buttons in only one free region.

FIG. 16 shows the flow of the arrangement process performed at step S108 of FIG. 13. First, the area of the free region is compared with the area of substitute buttons planned to be displayed (step S401). If the free region can hold the substitute buttons (step S402; Yes), the substitute buttons are displayed in the free region (step S403), and processing proceeds to step S408.

If the free region cannot hold the substitute buttons (step S402; No), it is checked whether to scale down the substitute buttons (step S404). If scaling down of the substitute buttons is performed (step S404; Yes), the substitute buttons are scaled down and displayed such that the free region can hold the substitute buttons (step S405), and processing proceeds to step S408.

If scaling down of the substitute buttons is not performed (step S404; No), priorities are set on operating buttons corresponding to the substitute buttons in order of necessity, according to a screen being displayed (step S406). Then, only substitute buttons that can be held in the free region are displayed in descending order of priority (step S407). When acceptance of operations by the original operating buttons corresponding to the substitute buttons is invalidated (step S408), the process ends.

Although the embodiment of the present invention has been described above using the drawings, specific configurations are not limited to those described in the embodiment, and the present invention also includes changes and additions as fall within the spirit of the present invention.

Although in the embodiment of the present invention, when a plurality of free regions are detected, substitute buttons are displayed in any one of the plurality of free regions, the substitute buttons may be displayed in the plurality of free regions in a distributed manner. In addition, although in the embodiment of the present invention, free regions are detected from both of the display screens of the operating panel 30 and the portable terminal 40, a free region may be detected from at least either one of the display screens.

In the embodiment of the present invention, an image of a portion of the operating unit 32, in front of the front side of which the portable terminal 40 is located, is displayed in a free region, as substitute buttons (when the portable terminal 40 is placed on top of a part of the operating unit 32, only an image of the part is displayed in a free region, as substitute buttons). However, even when the portable terminal 40 is placed on top of a part of the operating unit 32, an image of the entire operating unit 32 may be displayed in a free region.

Although in the embodiment of the present invention, a substitute button display process is performed only during cooperative operation, a substitute button display process may be performed even when cooperative operation is not performed.

Although in the embodiment of the present invention, only when a free region cannot hold substitute buttons, the substitute buttons are scaled down and displayed or only some of the substitute buttons are displayed, even when the free region can sufficiently hold the substitute buttons, the substitute buttons may be scaled down and displayed or only some of the substitute buttons may be displayed.

Although in the embodiment of the present invention, the image processing apparatus 10 is used as an example of an operation display apparatus of the present invention, the operation display apparatus of the present invention is not limited thereto, and any apparatus including an operating unit and a display unit may be used. In addition, the present invention also includes a program that causes an information processing apparatus including an operating unit and a display unit to function as the image processing apparatus 10 of the embodiment.

In addition, although in the embodiment of the present invention, the camera 34 of the image processing apparatus 10 detects a position of the portable terminal 40, the portable terminal 40 may detect a position thereof. An external apparatus may be provided to detect a position of the portable terminal 40.

Although in the embodiment of the present invention, the image processing apparatus 10 obtains information on free regions within the display screens of the operating panel 30 and the portable terminal 40, the portable terminal 40 may obtain the information and determine in which free region the substitute buttons are to be displayed. In this case, the CPU 41 serves as a free region detecting unit and an operation control unit of the present invention. In addition, an external apparatus may be provided to obtain information on free regions within the display screens of the operating panel 30 and the portable terminal 40, and determine in which free region the substitute buttons are to be displayed. In this case, the external apparatus serves as a free region detecting unit and an operation control unit. The present invention also includes a portable terminal that obtains information on free regions and determines in which free region the substitute buttons are to be displayed, and a program therefor.

In the embodiment of the present invention, the image processing apparatus 10 determines whether the portable terminal 40 is located on the front side of the operating panel 30, and displays, in a free region, an image (substitute buttons) of operating buttons, in front of the front side of which the portable terminal 40 is located. However, the portable terminal 40 may determine whether the portable terminal 40 is located on the front side of the operating panel 30, by, for example, analyzing an image obtained by photographing by the camera 45, and display, in a free region, an image (substitute buttons) of operating buttons, in front of the front side of which the portable terminal 40 is located. In this case, the camera 45 and the CPU 41 serve as a position detecting unit of the present invention. For example, the portable terminal 40 performs the process of FIG. 13, and when a free region on the display screen of the operating panel 30 is used as a substitute button display location, the portable terminal 40 may transmit an instruction to display substitute buttons in the free region, to the image processing apparatus 10. An external apparatus may be provided to perform the above-described determination and transmission of the instruction. In this case, the external apparatus serves as a position detecting unit of the present invention. The present invention also includes a portable terminal that performs the above-described determination and instruction and a program therefor.

According to an embodiment of an operation display apparatus, a portable terminal, programs therefor, and an operation display system of the present invention, when a portable terminal is brought close to an operating unit and used, the same operations, as those performed on the operating unit that is hidden behind the portable terminal and thus cannot be operated by a user can be accepted from the user.

Although the present invention has been described and illustrated in detail, it is clearly understood that the same is by way of illustrated and example only and is not to be taken by way of limitation, the scope of the present invention being interpreted by terms of the appended claims.

What is claimed is:
1. An operation display apparatus comprising:
an operating unit possessing a front side, the operating unit comprising at least one hard key on the front side;
a display unit;
a camera configured to communicate with a hardware processor to detect a position of a predetermined portable terminal; and
the hardware processor being configured to:
detect a free region on a display screen of at least one of the display unit and the portable terminal,
display an image of a blocked portion of the front side of the operating unit in the free region when the position of the portable terminal detected by the hardware processor overlaps the blocked portion of the front side of the operating unit, the image of the blocked portion of the front side including at least one substitute button corresponding to the at least one hard key, and
accept an operation performed on the image of the blocked portion of the operating unit as an operation received by the operating unit.

2. The operation display apparatus according to claim 1, wherein the hardware processor displays, in the free region, an image of a portion of the operating unit, the portable terminal being located in front of the front side of the portion of the operating unit.

3. The operation display apparatus according to claim 1, wherein the hardware processor switches whether to perform the display, based on whether the position of the portable terminal detected by the camera and hardware processor is within a predetermined distance in a frontward direction of the front side of the operating unit.

4. The operation display apparatus according to claim 1, wherein the hardware processor invalidates acceptance of an operation performed on a portion of the operating unit that appears in the image, while the image of the operating unit is displayed in the free region.

5. The operation display apparatus according to claim 1, wherein, when the hardware processor detects a plurality of free regions, the hardware processor selects a largest region among the plurality of free regions, as a free region where the display is to be performed.

6. The operation display apparatus according to claim 1, wherein, when the hardware processor detects a plurality of free regions, the hardware processor notifies a user of the plurality of free regions, and receives specification of a free region where the display is to be performed from among the plurality of free regions, and selects the specified free region as a free region where the display is to be performed.

7. The operation display apparatus according to claim 1, wherein the hardware processor scales down the image of the operating unit and displays the scaled-down image in the free region.

8. The operation display apparatus according to claim 1, wherein
the operating unit includes a plurality of operating buttons, and
the hardware processor displays, in the free region, an image of some of operating buttons, the portable terminal being located in front of a front side of the operating buttons.

9. The operation display apparatus according to claim 8, wherein the hardware processor displays, in the free region, an image of an operating button on a priority basis among the operating buttons, the portable terminal being located in front of the front side of the operating buttons, and the operating button being used for an operation performed on a screen being displayed by the display unit.

10. The operation display apparatus according to claim 1, wherein
the camera and hardware processor repeatedly perform the detection, and
when there is a change in a result of the detection, the hardware processor changes content of the display, according to the change in the result of the detection.

11. An operation display system including a portable terminal and an operation display apparatus including an operating unit and a display unit, the operating unit possessing a front side, the operating unit comprising at least one hard key on the front side, the system comprising:
a camera configured to communicate with a hardware processor to detect a position of the portable terminal relative to the operation display apparatus; and
the hardware processor being configured to:
detect a free region on a display screen of at least one of the display unit and the portable terminal,
display an image of a blocked portion of the front side of the operating unit in the free region when the position of the portable terminal detected by the hardware processor overlaps the blocked portion of the front side of the operating unit, the image of the blocked portion of the front side including at least one substitute button corresponding to the at least one hard key, and
accept an operation performed on the image of the blocked portion of the operating unit as an operation received by the operating unit.

12. The operation display system according to claim 11, wherein the hardware processor displays, in the free region, an image of a portion of the operating unit, the portable terminal being located in front of the front side of the portion of the operating unit.

13. The operation display system according to claim 11, wherein the hardware processor switches whether to perform the display, based on whether the position of the portable terminal detected by the camera and hardware processor is within a predetermined distance in a frontward direction of the front side of the operating unit.

14. The operation display system according to claim 11, wherein the hardware processor invalidates acceptance of an operation performed on a portion of the operating unit that appears in the image, while the image of the operating unit is displayed in the free region.

15. The operation display system according to claim 11, wherein, when the hardware processor detects a plurality of free regions, the hardware processor selects a largest region among the plurality of free regions, as a free region where the display is to be performed.

16. The operation display system according to claim 11, wherein, when the hardware processor detects a plurality of free regions, the hardware processor notifies a user of the plurality of free regions, and receives specification of a free region where the display is to be performed from among the plurality of free regions, and selects the specified free region as a free region where the display is to be performed.

17. The operation display system according to claim 11, wherein the hardware processor scales down the image of the operating unit and displays the scaled-down image in the free region.

18. The operation display system according to claim 11, wherein
the operating unit includes a plurality of operating buttons, and
the hardware processor displays, in the free region, an image of some of operating buttons, the portable terminal being located in front of a front side of the operating buttons.

19. The operation display system according to claim 18, wherein the hardware processor displays, in the free region, an image of an operating button on a priority basis among the operating buttons, the portable terminal being located in front of the front side of the operating buttons, and the operating button being used for an operation performed on a screen being displayed by the display unit.

20. The operation display system according to claim 11, wherein the camera and hardware processor repeatedly perform the detection, and
when there is a change in a result of the detection, the hardware processor changes content of the display, according to the change in the result of the detection.

21. A portable terminal comprising:
an operation input unit;
a display unit;
a camera configured to communicate with a hardware processor to detect a position of the terminal; and
the hardware processor being configured to:
detect a free region on a display screen of at least one of a predetermined operation display apparatus and the display unit, the operation display apparatus including an operating unit which possesses a front side, the operating unit comprising at least one hard key on the front side,
display an image of a blocked portion of the front side of the operating unit in the free region when the position of the terminal detected by the hardware processor overlaps the blocked portion of the front side of the operating unit, the image of the blocked portion of the front side including at least one substitute button corresponding to the at least one hard key, and accept an operation performed on the image of the blocked portion of the operating unit as an operation received by the operating unit.

22. The portable terminal according to claim 21, wherein the hardware processor displays, in the free region, an image of a portion of the operating unit, the terminal being located in front of the front side of the portion of the operating unit.

23. The portable terminal according to claim 21, wherein the hardware processor switches whether to perform the display, based on whether the position of the terminal detected by the camera and hardware processor is within a predetermined distance in a frontward direction of the front side of the operation input unit.

24. The portable terminal according to claim 21, wherein the hardware processor invalidates acceptance of an operation performed on a portion of the operating unit that appears in the image, while the image of the operating unit is displayed in the free region.

25. The portable terminal according to claim 21, wherein, when the hardware processor detects a plurality of free regions, the hardware processor selects a largest region among the plurality of free regions, as a free region where the display is to be performed.

26. The portable terminal according to claim 21, wherein, when the hardware processor detects a plurality of free regions, the hardware processor notifies a user of the plurality of free regions, and receives specification of a free region where the display is to be performed from among the plurality of free regions, and selects the specified free region as a free region where the display is to be performed.

27. The portable terminal according to claim 21, wherein the hardware processor scales down the image of the operating unit and displays the scaled-down image in the free region.

28. The portable terminal according to claim 21, wherein the operating unit includes a plurality of operating buttons, and
the hardware processor displays, in the free region, an image of some of operating buttons, the portable terminal being located in front of a front side of the operating buttons.

29. The portable terminal according to claim 28, wherein the hardware processor displays, in the free region, an image of an operating button on a priority basis among the operating buttons, the terminal being located in front of the front side of the operating buttons, and the operating button being used for an operation performed on a screen being displayed by the display unit.

30. The portable terminal according to claim 21, wherein the camera and hardware processor repeatedly perform the detection, and
when there is a change in a result of the detection, the hardware processor changes content of the display, according to the change in the result of the detection.

31. A non-transitory recording medium storing a computer readable program for causing an information processing apparatus to function as an operation display apparatus according to claim 1.

32. A non-transitory recording medium storing a computer readable program for causing a portable information processing apparatus to function as the portable terminal according to claim 21.

33. The operation display apparatus according to claim 1, wherein the position of the portable terminal detected by the hardware processor is spaced apart from the blocked portion of the front side of the operating unit by a distance such that the portable terminal avoids contacting the front side of the operating unit.

34. The operation display system according to claim 11, wherein the position of the portable terminal detected by the hardware processor is spaced apart from the blocked portion of the front side of the operating unit by a distance such that the portable terminal avoids contacting the front side of the operating unit.

35. The portable terminal according to claim 21, wherein when the image of the blocked portion is being displayed, the portable terminal is spaced apart from the blocked portion of the front side of the operating unit of the operation display apparatus by a distance such that the portable terminal avoids contacting the front side of the operating unit.

* * * * *